United States Patent
Kurosawa et al.

(10) Patent No.: US 9,293,022 B2
(45) Date of Patent: Mar. 22, 2016

(54) DETECTING APPARATUS, DETECTING SYSTEM, AND DETECTING METHOD

(71) Applicant: Renesas Electronics Corporation, Kawasaki-shi, Kanagawa (JP)

(72) Inventors: Takayuki Kurosawa, Kawasaki (JP); Tadaaki Tanimoto, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 14/526,683

(22) Filed: Oct. 29, 2014

(65) Prior Publication Data

US 2015/0139504 A1    May 21, 2015

(30) Foreign Application Priority Data

Nov. 19, 2013   (JP) .................................. 2013-239115

(51) Int. Cl.
```
G06K 9/00      (2006.01)
G08B 21/04     (2006.01)
G06T 7/20      (2006.01)
G08B 29/18     (2006.01)
```
(52) U.S. Cl.
CPC .......... *G08B 21/0415* (2013.01); *G06T 7/2006* (2013.01); *G06T 7/2013* (2013.01); *G08B 21/0476* (2013.01); *G08B 29/185* (2013.01); *G06T 2207/10016* (2013.01); *G06T 2207/20021* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 8,684,922 B2* | 4/2014 | Tran | ...................... | A61B 5/6816 600/300 |
| 2005/0280704 A1* | 12/2005 | Clare | .................. | G08B 13/1672 348/143 |
| 2008/0130948 A1* | 6/2008 | Ozer | ................... | G06K 9/00228 382/103 |
| 2008/0258907 A1* | 10/2008 | Kalpaxis | ............... | G08B 21/086 340/539.1 |
| 2009/0062696 A1* | 3/2009 | Nathan | ................. | A61B 5/1107 600/595 |
| 2011/0228979 A1* | 9/2011 | Nishino | ................. | G06T 7/2033 382/103 |
| 2012/0213285 A1* | 8/2012 | Yamamoto | ............ | G06T 7/2013 375/240.16 |

(Continued)

FOREIGN PATENT DOCUMENTS

JP    2002-232870 A    8/2002

*Primary Examiner* — Shervin Nakhjavan
(74) *Attorney, Agent, or Firm* — Sughrue Mion, PLLC

(57) ABSTRACT

The present invention provides a detecting apparatus for detecting an abnormal state such as a drop or fall of a person to be observed from a captured image in a real-time manner and realizing improvement in precision of the detection while eliminating the influence of a background image and noise. The detecting apparatus calculates a motion vector of each of blocks of an image of video data, and extracts a block group in which the size of the motion vector exceeds a predetermined value. The detecting apparatus forms a group from adjacent blocks. For example, in descending order of the area of the blocks, the detecting apparatus calculates characteristic amounts such as an average vector, a variance, and a rotation direction component of motion blocks included in the blocks. The detecting apparatus detects that the person to be observed is in an abnormal state such as a drop or fall on the basis of the characteristic amounts of the groups, and informs an external apparatus or the like of the detection result. The detecting apparatus corrects a deviation of the angle of the imaging direction on the basis of a process of reducing pixels in the horizontal direction of an image and acceleration of the camera, thereby improving the precision of the detection.

13 Claims, 22 Drawing Sheets

(56) References Cited

U.S. PATENT DOCUMENTS

2012/0314064 A1* 12/2012 Liu .................... G06K 9/00771
             348/143

2013/0164722 A1* 6/2013 Yoshimitsu ............ G09B 19/00
             434/236

* cited by examiner

FIG. 5

STORING UNIT ~13

GROUPING INFORMATION ~51

| IMAGE DATA | GROUP NAME | RANGE OF GROUP |
|---|---|---|
| 09:30:29.2 | Group1 | (4, 2), (4, 3),<br>(5, 2), (5, 3), (5, 4),<br>(6, 2), (6, 3), (6, 4) |
|  | Group2 | (5, 6), (6, 6), (6, 7) |
| ⋮ | ⋮ | ⋮ |

51A, 51B, 51C

CHARACTERISTIC AMOUNT INFORMATION ~52

| IMAGE DATA | GROUP NAME | CHARACTERISTIC AMOUNTS | | |
|---|---|---|---|---|
|  |  | AVERAGE VECTOR | VARIANCE | ROTATION |
| 09:30:29.2 | Group1 | a | b | c |
|  | Group2 | d | e | f |
| ⋮ | ⋮ | ⋮ | ⋮ | ⋮ |

52A, 52B, 52C

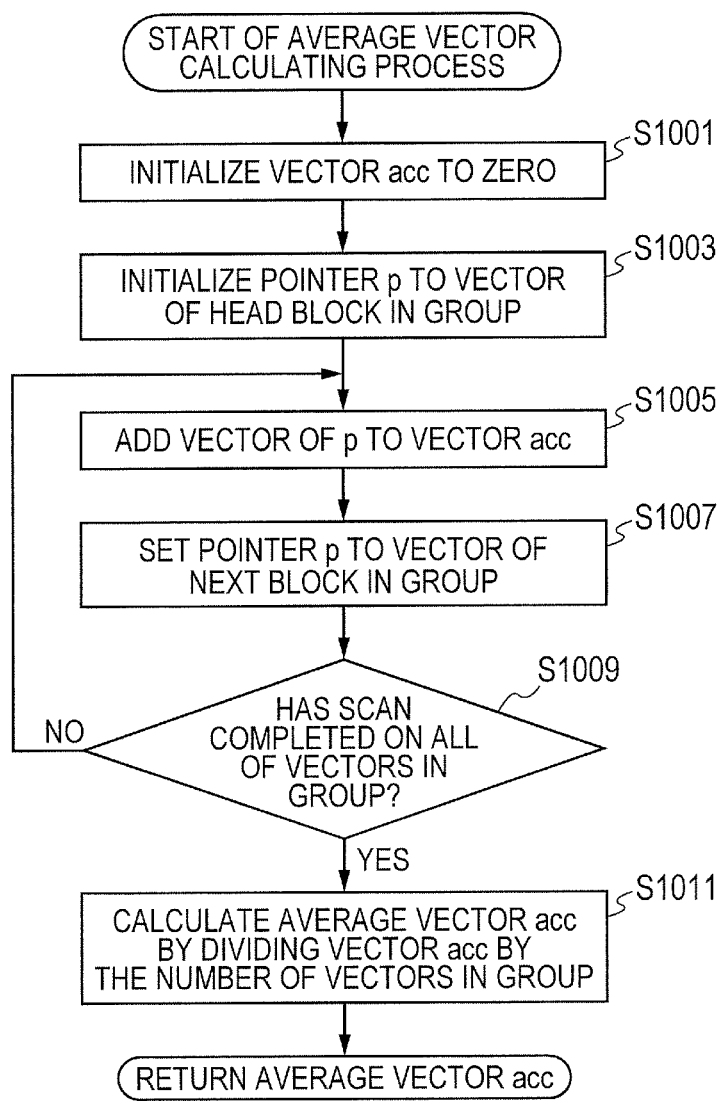

DETECTING APPARATUS, DETECTING SYSTEM, AND DETECTING METHOD

CROSS-REFERENCE TO RELATED APPLICATIONS

The disclosure of Japanese Patent Application No. 2013-239115 filed on Nov. 19, 2013 including the specification, drawings and abstract is incorporated herein by reference in its entirety.

BACKGROUND

The present invention relates to a detecting apparatus, a detecting system, and a detecting method for detecting a state such as of a person to be observed and, more particularly, to a technique of automatically detecting the state of a person to be observed by using an image.

There are cases such that an unexpected accident occurs in a space in a house or the like where a resident lives and the resident is injured or dead by the accident. It is known that the ratio of a drop and a fall is relatively high as the causes of those accidents. Particularly, in the case of elderly people, a drop or fall occurs also in a relatively flat place such as a living room or a hospital room. In the case of elderly people, there are many cases that an accident such as a drop or fall leads to death or a serious disorder. It is consequently important to efficiently find an abnormal situation such as a drop and promptly handle it in order to improve the living environment of elderly people. If the state of the person to be observed can be known anytime, an observer who wants to check the state of a person to be observed such as an elderly person can immediately deal with the abnormal state of the person to be observed.

Various systems for detecting an abnormal state of a person to be observed are examined. It is desirable to provide a detecting system which has an affinity to daily life of a person to be observed. For example, a system which gives consideration also to the privacy of a person to be observed while avoiding a physical burden such as attachment of a measuring device to the person to be observed as much as possible may be provided.

As a technique for promptly finding a drop or the like of an elderly person or the like, for example, there is Japanese Unexamined Patent Application Publication No. 2002-232870 (patent literature 1). According to a technique described in the patent literature 1, a detecting apparatus captures images of a person to be observed every predetermined interval and records them. The detecting apparatus calculates a motion vector for each of pixels on the basis of image data. The detecting apparatus calculates the sum of components in the gravity force direction of the motion vectors calculated for the pixels. The detecting apparatus preliminarily stores the size of a change of a motion vector in a predetermined period in the case where a person to be observed drops. The detecting apparatus compares the sum of the components in the gravity force direction of the motion vectors calculated with the threshold and, in the case where the component in the gravity force direction of the motion vector is larger than a threshold T, determines that the person to be observed drops. In the case where it is determined that the person to be observed drops, the detecting apparatus performs a process for notifying of the drop of the person to be observed. In such a manner, according to the technique described in the patent literature 1, a drop or the like of an elderly person or the like can be promptly found.

PRIOR ART LITERATURE

Patent Literature

Patent Literature 1: Japanese Unexamined Patent Application Publication No. 2002-232870

SUMMARY

According to the technique described in the patent literature 1, however, the sum of the components in the gravity force direction of the motion vectors using the motion vectors of an entire captured image as objects and the threshold are compared to determine whether a drop of the person to be observed such as an elderly person occurs or not. Consequently, according to the technique described in the patent literature 1, due to a motion of a background image, camera noise, or the like, a motion vector in the gravity force direction is generated with no relation to the state of the person to be observed, and there is a case that a drop of the person to be observed is erroneously detected. Therefore, a technique which increases the precision of detection while detecting an abnormal state of a person to be observed from a captured image in a real-time manner is needed.

The other problem and a novel feature will become apparent from the description of the specification and appended drawings.

A detecting apparatus according to an embodiment is to detect a motion state of a person to be observed from an image captured. The detecting apparatus includes an input/output unit, a memory, and a control unit. The detecting apparatus receives an input of video data by the input/output unit, and stores it into the memory. The control unit controls a process of detecting a motion state of the person to be observed on the basis of the video data stored in the memory. The control unit calculates a motion vector of each of a plurality of blocks of an image including the video data. The control unit extracts a block group as a set of the blocks in each of which the size of the motion vector exceeds a predetermined value on the basis of the calculated motion vectors. The control unit detects an abnormal motion state of the person to be observed on the basis of the motion vectors of the blocks included in the extracted block group. In the case where the abnormal motion state of the person to be observed is detected, the control unit makes an informing unit output a signal indicative of an abnormal state of the person to be observed.

The detecting apparatus according to the embodiment can detect an abnormal state such as a drop of the person to be observed in a real-time manner and notify an observer of the abnormal state while increasing the precision of the detection.

BRIEF DESCRIPTION OF THE DRAWINGS

FIG. 5 is a diagram illustrating the data structure of grouping information 51 and the data structure of characteristic amount information.

FIG. 10 is a flowchart illustrating processes of calculating an average vector of motion vectors of blocks included in a group.

DETAILED DESCRIPTION

Figure 1:
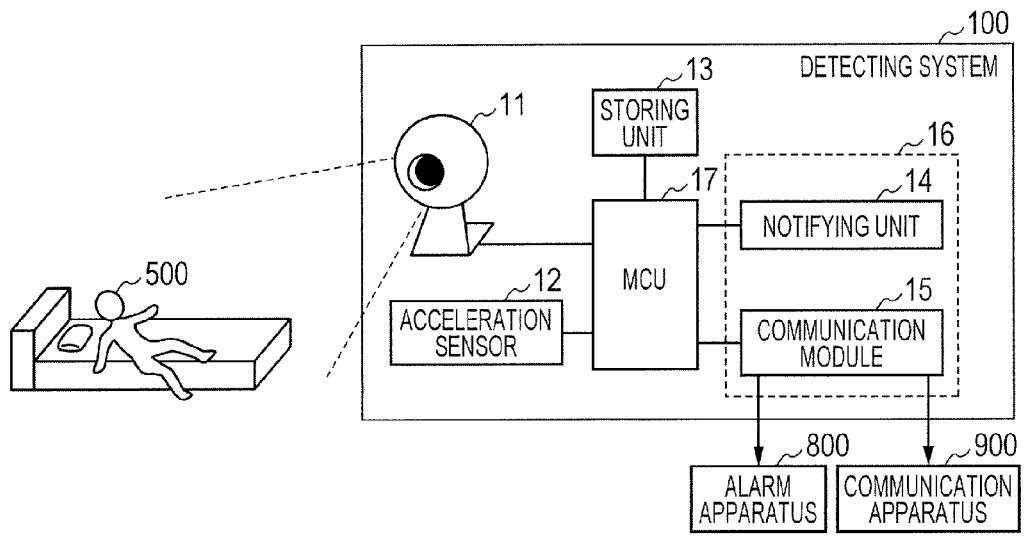
FIG. 1 is a block diagram illustrating the configuration of a detecting system.

Hereinafter, embodiments of the present invention will be described with reference to the drawings. In the following description, the same reference numerals are designated to the same parts. The names and the functions are also the same. Therefore, their detailed description will not be repeated.

First Embodiment

With reference to the drawings, a detecting system and a detecting apparatus of a first embodiment will be described.
<Configuration>

FIG. 1 is a block diagram illustrating the configuration of a detecting system. As illustrated in FIG. 1, a detecting system 100 includes a camera 11, an acceleration sensor 12, a storing unit 13, a notifying unit 14, a communication module 15, and an MCU 17. For example, in a space where a person 500 to be observed exists such as a hospital room, the detecting system 100 images the space by the camera 11 and detects that the person 500 to be observed makes an abnormal movement on the basis of the captured image. For example, the detecting system 100 detects that the person 500 to be observed drops or falls.

The camera 11 is, for example, a CCD (Charge Coupled Device) image sensor or CMOS (Complementary Metal-Oxide Semiconductor) image sensor having a photodiode, an ADC (Analog to Digital Converter), and the like. The camera 11 sequentially obtains images by imaging and outputs them as video data to the MCU 17. For example, the camera 11 is installed in a hospital room, a living room, a bed room, or other space and images the person 500 to be observed who acts in those spaces.

The acceleration sensor 12 is a sensor for detecting the tilt of the imaging direction of the camera 11 as acceleration in the gravity force direction and is, for example, a triaxial acceleration sensor. The acceleration sensor 12 outputs the detected accelerations in the three axes to the MCU 17.

The storing unit 13 is included by a RAM (Random Access Memory) or the like and, for example, when the MCU 17 performs computation or the like in the detecting system 100, stores data used for the computation.

As illustrated in FIG. 1, an informing unit 16 displays the function of informing that the MCU 17 detects the abnormal movement of the person 500 to be observed in accordance with the control of the MCU 17. The informing unit 16 includes the notifying unit 14 and the communication module 15.

The notifying unit 14 notifies of the information in accordance with the control of the MCU 17. For example, the notifying unit 14 is an LED (Light Emitting Diode), a display, a speaker, or the like and, in the case where the MCU 17 detects the abnormal movement of the person 500 to be observed, notifies that the person 500 to be observed drops by a visual method such as a display, an auditory method such as sound output from a speaker, or the like.

The communication module 15 displays a communication function for the detecting system 100 to communicate with a device on the outside. For example, the communication module 15 meets the Bluetooth (registered trademark), ZigBee (registered trademark), wireless LAN (Local Area Network) standard, or other wireless or wired communication method and is coupled to an apparatus on the outside by radio or by a wire. In the case where the MCU 17 detects an abnormal movement of the person 500 to be observed, the communication module 15 transmits information indicating that the person 500 to be observed drops to an alarm apparatus 800, a communication apparatus 900, and other external apparatuses in accordance with the control of the MCU 17. For example, the alarm apparatus 800 receives an alarm signal indicative of the abnormal movement of the person 500 to be observed, which is transmitted from the communication module 15 from the detecting system 100 and generates an alarm. The communication apparatus 900 receives the notification indicative of the abnormal movement of the person 500 to be observed from the detecting system 100 and outputs the information of the notification by the display of the communication apparatus 900, the speaker of the communication apparatus 900, or the like.

Figure 2:
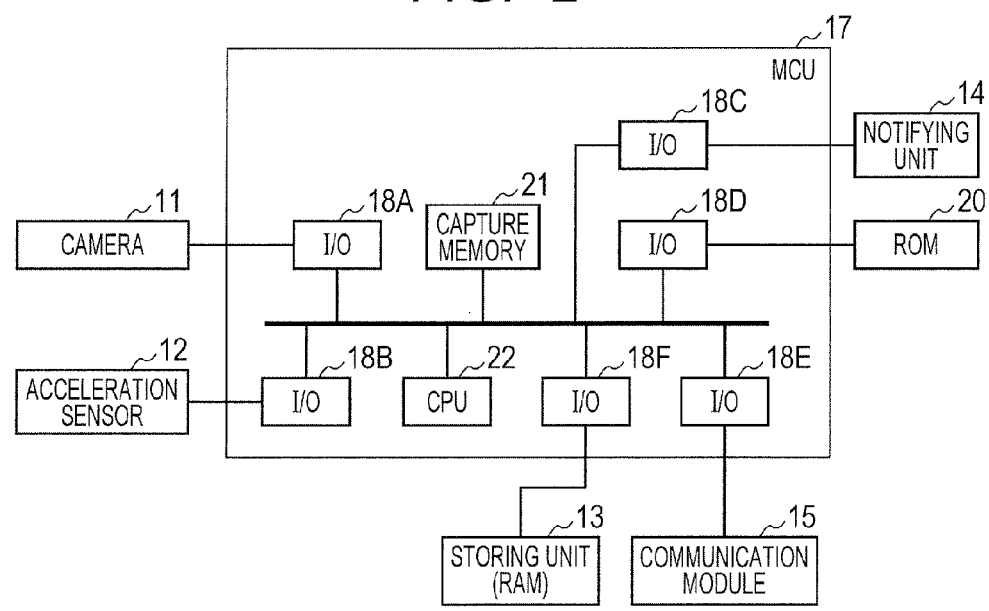
FIG. 2 is a block diagram illustrating the detailed configuration of an MCU (Micro Control Unit) 17.

FIG. 2 is a block diagram illustrating a detailed configuration of the MCU 17. As illustrated in FIG. 2, the MCU 17 includes a plurality of input/output units (I/O units 18A, 18B, 18C, 18D, 18E, and 18F), a capture memory 21, and a control unit (CPU (Central Processing Unit)) 22. The MCU 17 is coupled to the camera 11, the acceleration sensor 12, the storing unit 13, the notifying unit 14, the communication module 15, a ROM 20, and other external apparatuses and inputs/outputs data from/to the external apparatuses via the input/output (I/O) units 18A to 18F. Although the storing unit (RAM) 13 and the ROM 20 are illustrated on the outside of the MCU 17 in FIG. 2, the storing unit (RAM) 13 and the ROM 20 may be provided on the inside of the MCU 17.

The capture memory 21 is a memory region for storing video data and stores each of image frames including the video data.

The control unit 22 is a processor for controlling the operation of the MCU 17. For example, the control unit 22 reads and executes a program stored in the ROM 20 on start of the operation of the MCU 17. After start of the MCU 17, the control unit 22 stores the program and data into the storing unit 13 and operates according to the program.

The MCU 17 receives an entry of video data generated by the camera 11 via the I/O unit 18A and holds it in the capture memory 21. The MCU 17 obtains the acceleration of the camera 11 from the acceleration sensor 12 via the I/O unit 18B and stores the obtained acceleration into the storing unit 13.

Figure 3:
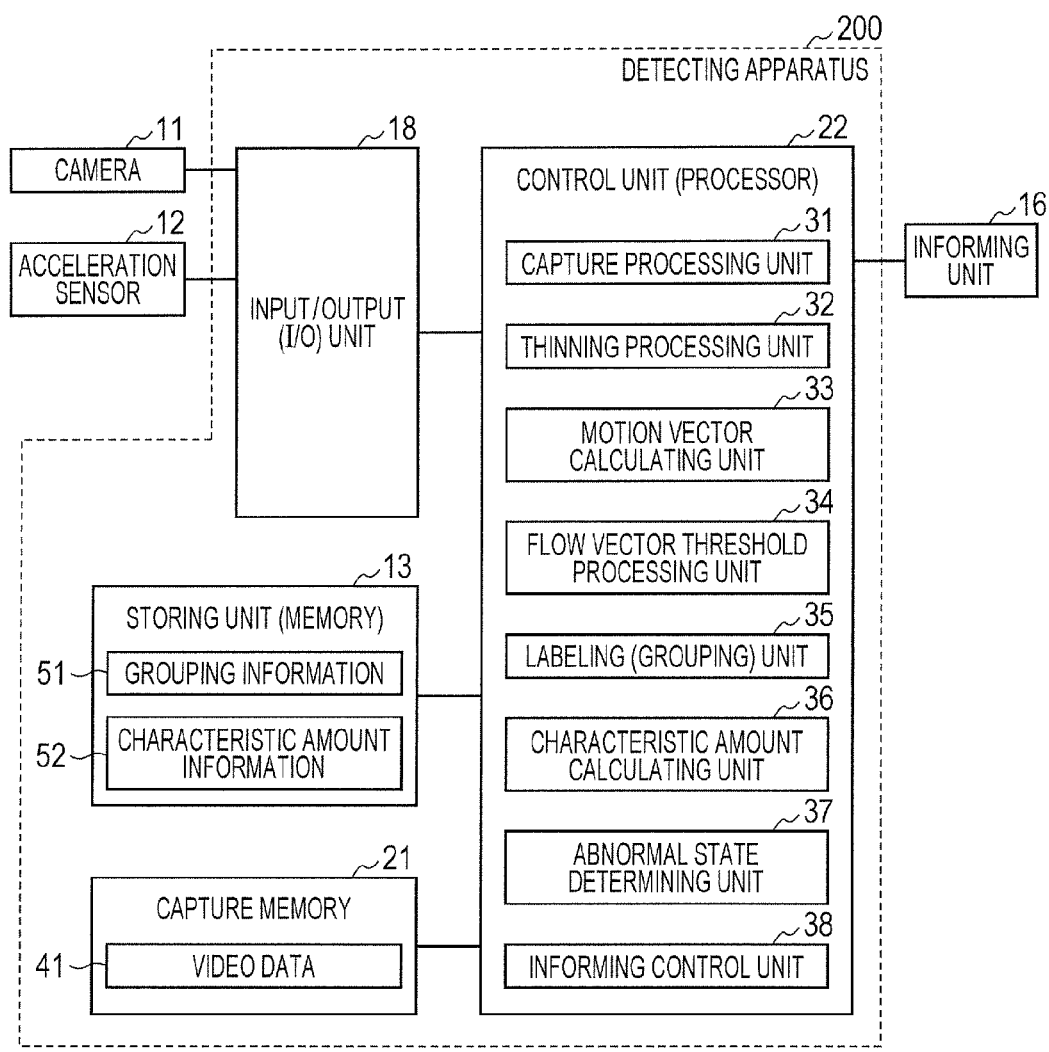
FIG. 3 is a block diagram illustrating functions of a detecting apparatus 200.

FIG. 3 is a block diagram illustrating functions of a detecting apparatus 200. FIGS. 4A to 4F are diagrams illustrating outlines of the functions of the detecting apparatus 200. As illustrated in FIG. 3, in the detecting system 100 of the first embodiment, the detecting apparatus 200 includes the I/O unit 18, the storing unit 13, the capture memory 21, and the control unit 22.

The capture memory 21 stores video data 41 obtained from the camera 11 by the detecting apparatus 200.

The control unit 22 performs a process of detecting the movement state of the person 500 to be observed on the basis of the video data 41 stored in the capture memory 21. The control unit 22 operates in accordance with the program, thereby displaying the functions of a capture processing unit 31, a thinning processing unit 32, a motion vector calculating unit 33, a flow vector threshold processing unit 34, a labelling unit 35, a characteristic amount calculating unit 36, an abnormal state determining unit 37, and an informing control unit 38.

The capture processing unit 31 performs a process of receiving the video data generated by the camera 11 by the detecting apparatus 200 and storing it into the capture memory 21.

Prior to a process of calculating a motion vector (flow vector) of the video data 41 which will be described later, the thinning processing unit 32 preliminarily performs a process of reducing a part of pixels including the video data 41. In the first embodiment, the thinning processing unit 32 performs, for example, a process of thinning the pixels in the horizontal direction (the direction perpendicular to the gravity force direction) of the video data 41. For example, the thinning processing unit 32 performs the thinning by averaging two pixels in the horizontal direction of the video data 41 to one pixel. In such a manner, the number of pixel blocks as an object of calculation of a motion vector which will be described later is decreased, thereby increasing the speed of the following processes. As another method, by thinning the pixels in the horizontal direction of the video data 41 by the thinning processing unit 32, the component in the horizontal direction of the motion vector is made smaller, and the component of the motion vector in the gravity force direction can be increased. In the case where the person 500 to be observed drops or falls, the person 500 to be observed which is seen as a subject in the video data 41 becomes a block group having a large motion vector in the gravity force direction in an image. Consequently, by thinning the pixels in the horizontal direction by the thinning processing unit 32, while maintaining the precision of detection of a drop or fall of the person 500 to be observed, a calculation amount of the motion vector can be reduced.

The motion vector calculating unit 33 calculates a motion vector of each of the plurality of blocks of the image. In the first embodiment, the image subjected to the thinning process by the thinning processing unit 32 is included by the plurality of blocks. Each of the plurality of blocks includes, for example, eight pixels×eight pixels. However, the invention is not limited to the configuration. The motion vector calculating unit 33 divides an image into blocks of equal intervals and cuts an image block by block. The motion vector calculating unit 33 calculates a motion vector by comparing the cut image with, for example, the image of the immediately preceding frame. For example, while moving (shifting) the image which is cut block by block, the cut image is compared with the image of the immediately preceding frame and a position (shift position) in which similarity of the images is high is used as the motion vector of the block.

The flow vector threshold processing unit 34 compares the size of each of the motion vectors for the plurality of blocks and a threshold and selects a motion vector having a predetermined size in the motion vectors. To reduce the influence of a small motion vector caused by a change in brightness or the like of the video data 41 not a drop of the person 500 to be observed, the detecting apparatus 200 eliminates a motion vector smaller than the threshold from objects to be calculated by the flow vector threshold processing unit 34 in a process of detecting an abnormal movement of the person 500 to be observed.

The labeling (grouping) unit 35 performs grouping (labeling) which forms a group from adjacent blocks of the motion vector having predetermined size in the plurality of blocks including the image, and designates a name to the group so that the groups can be identified.

The characteristic amount calculating unit 36 calculates, using motion vectors of the formed block group as an object, characteristic amounts of the blocks such as an average value of gravity-force-direction components of the motion vectors, a variance of the motion vectors, and the value of a rotation direction component made by the motion vector of each block using the center of gravity of the block group as a center.

On the basis of the characteristic amount calculated by the characteristic amount calculating unit 36 on each of the group of blocks grouped, the abnormal state determining unit 37 detects an abnormal motion state that the person 500 to be observed drops or falls.

In the case where an abnormal motion state of the person 500 to be observed is detected by the abnormal state determining unit 37, the informing control unit 38 controls a process of informing that the person 500 to be observed is in an abnormal motion state such as a drop or fall by the informing unit 16. For example, the informing control unit 38 informs an external apparatus of the fact that the person 500 to be observed is in an abnormal motion state by the communication module 15.

Figure 4A:
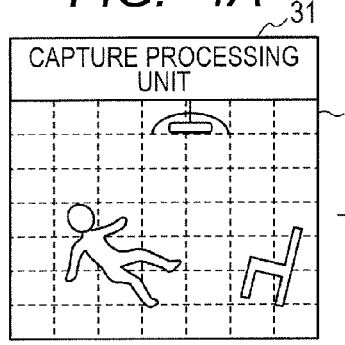
FIGS. 4A to 4F are diagrams illustrating outline of the functions of the detecting apparatus 200.
Figure 4B:
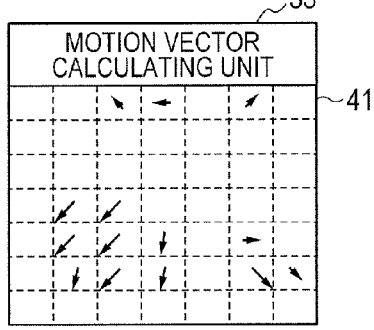
Figure 4C:
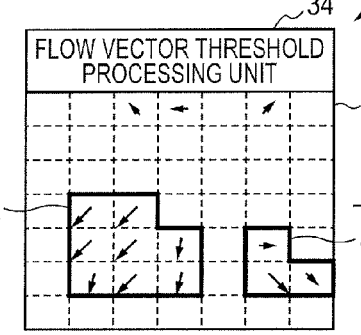

The functions of the control unit 22 will be concretely described. As illustrated in FIG. 4A, the capture processing unit 31 stores an image generated by the camera 11 as the video data 41 into the capture memory 21. As illustrated in FIG. 4B, the motion vector calculating unit 33 calculates a motion vector on each of the blocks of the image including the video data 41. In FIG. 4B, each of the motion vectors is expressed by the size and the direction of an arrow. As illustrated in FIG. 4C, the flow vector threshold processing unit 34 selects motion vectors having predetermined size or larger (pixel block groups 43A and 43B) and sends them to a grouping process by the labeling unit 35.

Figure 4D:
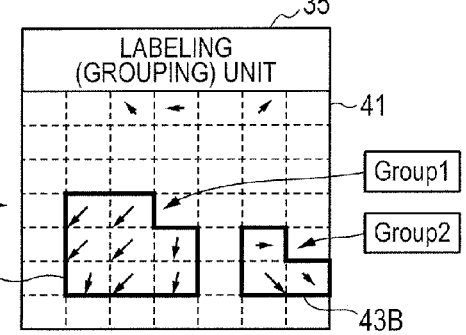
Figure 4E:
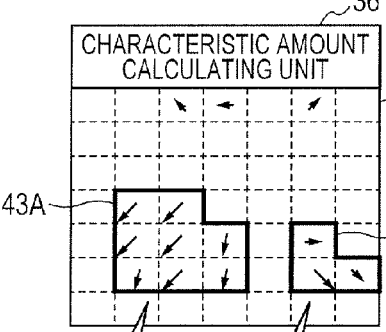

As illustrated in FIG. 4D, the labeling unit 35 performs a process of identifying adjacent blocks as a group by the group name, having the motion vectors of the predetermined size or larger selected by the flow vector threshold processing unit 34. In the example of FIG. 4D, the group name "Group 1" is given to the pixel block group 43A, and the group name "Group 2" is given to the pixel block group 43B. As illustrated in FIG. 4E, the characteristic amount calculating unit 36 calculates the characteristic amounts of the motion vectors of each group on the basis of the motion vectors of the groups labeled. In the example of FIG. 4E, the characteristic amount calculating unit 36 calculates, as characteristic amounts of each group, an average vector and a variance of motion vectors of the blocks included in each group and the value of the rotation direction component of the motion vector of each block using the block as the center of gravity of each group as a center.

Figure 4F:
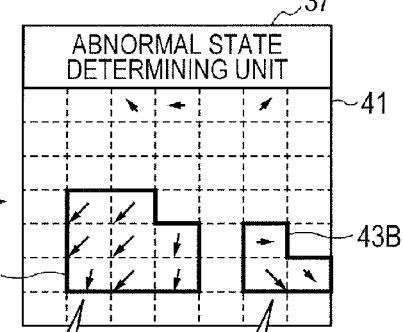

The abnormal state determining unit 37 compares the characteristic amount of each group calculated by the characteristic amount calculating unit 36 with the threshold to detect whether the person 500 to be observed is in an abnormal state of a drop or fall in each group. In the example of FIG. 4F, the pixel block group 43A is detected that the person 500 to be observed is in an abnormal state as the person 500 to be observed drops. In the pixel block group 43B, it is not detected that the person 500 to be observed is in the abnormal state.

<Data>

With reference to FIG. 5, data used by the detecting apparatus 200 will be described. FIG. 5 is a diagram illustrating the data structure of grouping information 51 and the data structure of characteristic amount information 52.

The grouping information 51 is information indicating the range of a block group to be grouped by the labeling unit 35. For example, each of images including the video data 41 is made of a plurality of blocks in X rows and Y rows. For example, the block in the row x and the column y as one of the blocks included in the image is expressed as the block (x, y).

Image data 51A is information identifying each of the images of the video data 41 included by a plurality of frames. In the example of FIG. 5, images are identified by time corresponding to reproduction positions of the video data.

Group name 51B indicates information identifying each group (name of the group) formed by the labeling unit 35 in each image.

A group range 51C indicates blocks included in each group.

The characteristic amount information 52 is a diagram illustrating characteristic amounts calculated by the characteristic amount calculating unit 36 with respect to the block groups formed by the labeling unit 35.

Image data 52A indicates information for identifying each of images of the video data 41 included by a plurality of frames.

Group name 52B indicates information for identifying groups formed by the labeling unit 35 in each image.

Characteristic amounts 52C indicate characteristic amounts (average of motion vectors of blocks including each group, variance of motion vectors, and the value of the rotational direction component of each motion vector using the center of gravity of the block group formed as a center position) calculated by the characteristic amount calculating unit 36 for each of the groups.

<Operation>

Referring to FIGS. 6 to 14, the operation of the detecting system 100 of the first embodiment and the detecting apparatus 200 as a component of the detecting system 100 will be described. As illustrated in FIG. 1 and the like, the detecting system 100 is mounted in a room where the person 500 to be observed lives and always images the inside of the room by the camera 11. For example, the detecting system 100 is mounted in a hospital room or a living room, a bed room, or the like where the person 500 to be observed lives a daily life. In the detecting system 100, the detecting apparatus 200 receives the video data 41 generated by the camera 11 and detects an abnormal motion state such as a drop of the person 500 to be observed. When the detecting apparatus 200 detects a drop or the like of the person 500 to be observed, the drop or the like of the person 500 to be observed is informed by the informing unit 16. For example, the detecting apparatus 200 transmits a signal indicating that the person 500 to be observed drops to an external apparatus (such as the communication apparatus 900 or the like) via the communication module 15. An external apparatus such as the communication apparatus 900 receives the notification from the detecting apparatus 200 and informs that the person 500 to be observed is in an abnormal state by, for example, display of the display, voice, or the like.

Figure 6:
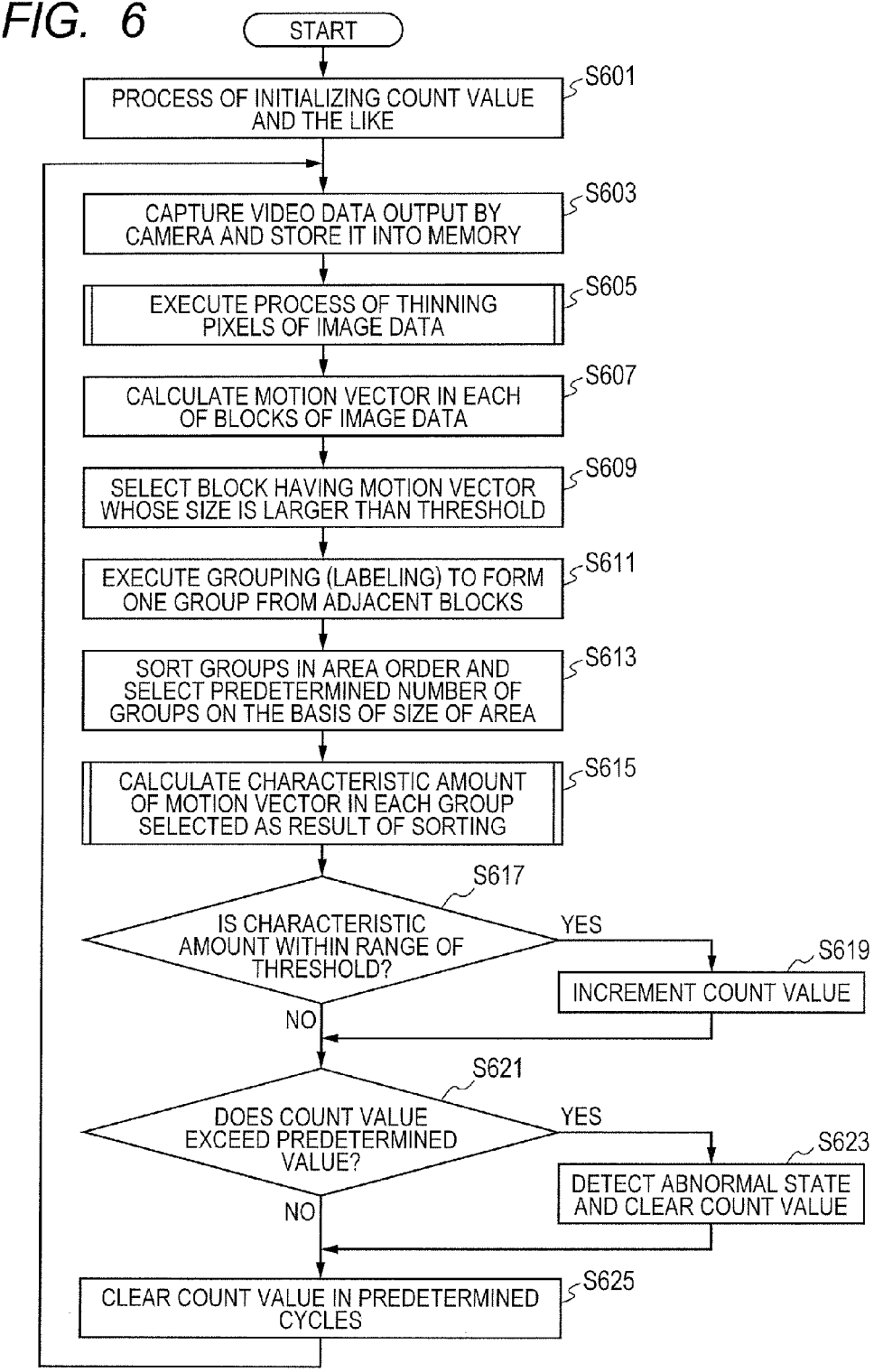
FIG. 6 is a flowchart illustrating processes for detecting a drop or fall of a person 500 to be observed on the basis of an image captured by a camera 11 by a control unit 22 of the detecting apparatus 200.

FIG. 6 is a flowchart illustrating the processes of detecting a drop or fall of the person 500 to be observed on the basis of an image captured by the camera 11 by the control unit 22 of the detecting apparatus 200.

In step S601, the control unit 22 performs an initializing process for detecting a drop or fall of the person 500 to be observed. For example, the control unit 22 sets an initial value as the value of a counter which will be described later.

In step S603, the control unit 22 captures each of images of the video data output from the camera 11 and stores it into the capture memory 21.

In step S605, the control unit 22 performs a thinning process of reducing a part of the pixels of an image to be processed. The details of the process will be described by using drawings. By performing the thinning process by the control unit 22, the number of pixels as objects of a motion vector calculating process and the like which will be described later is reduced. In the first embodiment, the control unit 22 reduces the pixels in the horizontal direction of each of images including the video data 41, thereby improving the detection precision of a motion vector in the gravity force direction. The control unit 22 stores the image data obtained by reducing the pixels in the horizontal direction of each of the images of the video data 41 by the thinning process into a memory.

In step S607, the control unit 22 calculates motion vectors of the image subjected to the thinning process in step S605 block by block. It is assumed that each of the blocks includes 8 pixels×8 pixels.

In step S609, the control unit 22 compares the size of the motion vector of each block with the threshold and selects a block having a motion vector larger than the threshold. The threshold is set, for example, on the basis of the size of a motion vector in the case where the person 500 to be observed makes an abnormal motion such as a drop or fall. By the process of step S609, the influence of a motion vector which is smaller than the size of the motion vector in the case where the person 500 to be observed makes an abnormal motion can be eliminated in the process of detecting the state of the motion of the person 500 to be observed.

In step S611, the control unit 22 performs a process of making each group identifiable by grouping adjacent blocks in the blocks selected in step S609 into one group (block group) and setting the name of each group. The control unit 22 associates the range of the blocks included in each group with the name of the group and the image and stores them as the grouping information 51 into the memory.

In step S613, the control unit 22 sets priority on the basis of the number of blocks (the area of blocks) included in a group for each of the groups formed in step S611. Concretely, the control unit 22 sorts the groups in order of the areas of the groups. The area of each of the groups is calculated on the basis of the range of the group indicated by the group information 51. The control unit 22 selects, for example, the upper three groups in the groups sorted in the descending order of the areas.

In step S615, the control unit 22 calculates the characteristic amount of the motion vector on the basis of the motion vectors of the blocks included in a group for the groups sorted and selected in step S613. The characteristic amounts of the motion vector of each of the blocks included in the group are, for example, the average value of components in the gravity force direction of the motion vectors, variance of the motion vectors, and the value of the rotation direction component made by the motion vector of each block using the block as the center of gravity of the block group included in the group as a center. The details will be described later with reference to the drawings.

In step S617, the control unit 22 calculates a determination value D for determination on the basis of the characteristic amounts of the motion vectors of each group calculated in step S615 and compares the determination value D with the threshold to estimate whether or not the subject shown in each group drops or falls. The determination value D is calculated by, for example, the following equation (1). In the case where the determination value D calculated lies in a range of the threshold (YES in step S617), the control unit 22 estimates that the subject indicated by the group drops or falls and advances to the process in step S619. In the other case (NO in step S617), the control unit 22 advances to the process in step S621.

$$D = \alpha Vacc + \beta Vrot - \gamma Vvar \qquad \text{Equation (1)}$$

An average value Vacc is an average value of components in the gravity force direction of the motion vector. A rotation direction component Vrot is the value of the rotation direction component made by the motion vector of each block using the block as the center of gravity of the group as a center. The block as the center of gravity of the group of blocks is the block including the center of gravity when the block group is expressed in the plane figure.

A variance Vvar is a variance of the motion vectors of the blocks included in the group. $\alpha$, $\beta$, and $\gamma$ are parameters for determining the weight. The average value Vacc is a characteristic amount indicative of a drop, and the rotation direction component Vrot is a characteristic amount indicative of a drop. Consequently, in the case where the average value Vacc and the rotation direction component Vrot are large, the possibility that the subject drops or falls is high. In the case where the variance Vvar is large, the possibility of erroneous detection caused by noise of the video data 41 is high. Therefore, the variance Vvar is set as a suppression term in the calculation formula of the determination value D.

In step S619, the control unit 22 increments the value of the counter for detecting the state of the abnormal motion of the person 500 to be observed.

In step S621, the control unit 22 determines whether the value of the counter exceeds a predetermined value or not. The value to be compared with the counter value is set so that, for example, in the case where a period in which it is estimated that the subject shown in each group drops or falls in the process of step S617 continues for a predetermined period (for example, about 0.5 second) or longer, the control unit 22 detects that the subject is in an abnormal motion state. In the case where video data of one second includes images of 30 frames, the characteristic amounts are calculated by the process in step S615 for each of the images, and the determining process is performed in step S617, for example, the predetermined value to be compared with the counter value is set to "15" (corresponding to 0.5 second). In such a manner, in the case where a large motion vector which is not a drop or fall of the person 500 to be observed occurs instantaneously, erroneous detection can be avoided. In the case where it is determined in step S621 that the value of the counter exceeds the predetermined value (YES in step S621), the control unit 22 performs the process in step S623. In the other case (NO in step S621), the control unit 22 performs the process in step S625.

In step S623, the control unit 22 outputs a signal indicating that the person 500 to be observed is in an abnormal motion state and clears the count value. For example, the control unit 22 performs a process of setting a flag indicating that the person 500 to be observed is in the abnormal motion state. When it is detected that the person 500 to be observed is in the abnormal motion state, the control unit 22 performs a process (informing control) for informing the abnormal state of the person 500 to be observed by notification of the notifying unit 14, output of the signal to an external apparatus such as the communication apparatus 900, and another process.

In step S625, the control unit 22 performs a process of clearing the counter value every period (for example, about 10 seconds) sufficiently longer than the time in which the person 500 to be observed drops or falls.

The control unit 22 repeats the processes in the step S603 and subsequent steps for each of the images including the video data 41. Thinning Process (step S605)

Figure 7:
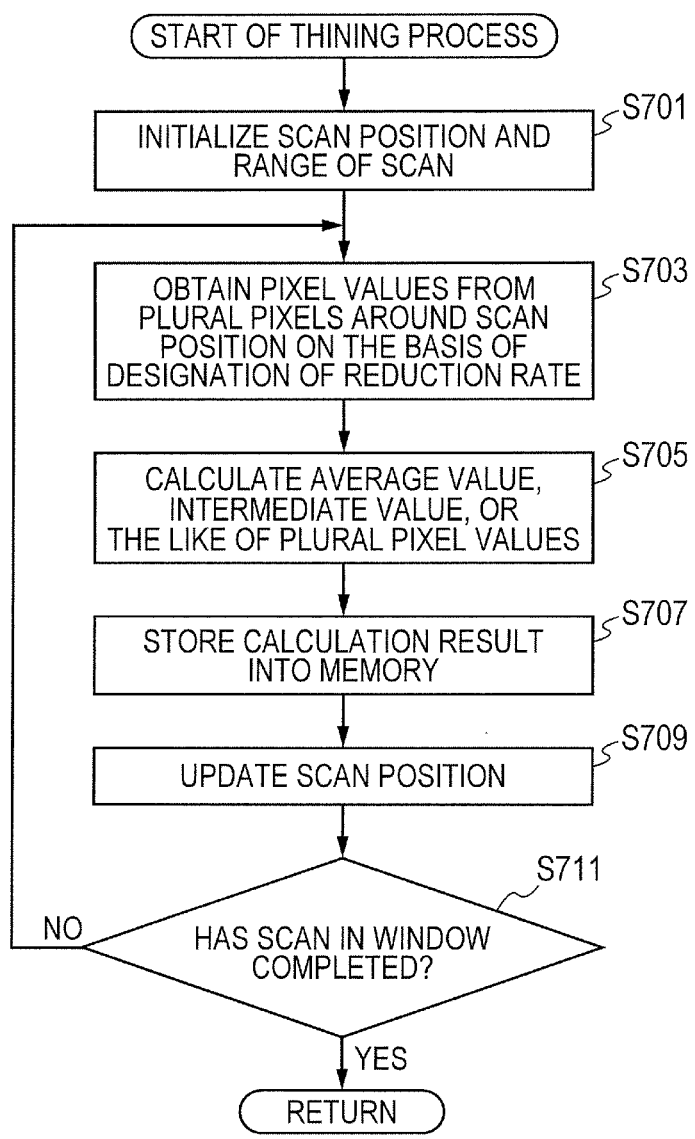
FIG. 7 is a flowchart illustrating a thinning process of thinning pixels of each of images including video data 41.

With reference to FIG. 7 and FIGS. 8A to 8D, the details of the thinning process described in step S605 will be explained. FIG. 7 is a flowchart illustrating the thinning process of reducing the pixels of each of the images including the video data 41. The control unit 22 performs the thinning process by calling the thinning process and passing image data to be processed and various parameters such as a reduction rate of reducing the image data and a direction of scanning the image data. For example, the control unit 22 receives information of the tilt of the camera 11 output from the acceleration sensor 12 and tilts the direction of the scan of the image data from the horizontal direction on the basis of a deviation of the roll angle of the camera 11.

In step S701, the control unit 22 performs a process of initializing the start position of the scan of the image data, the range of the scan, and the like. For example, the control unit 22 sets the upper left pixel in pixels included in an image as the start position of the scan.

In step S703, the control unit 22 obtains values of a plurality of pixels arranged in the scan direction from the scan position on the basis of designation of the parameter of the reduction rate. For example, in the case where the reduction rate is 50% (the values of two pixels are averaged and the average value is set as the value of one pixel), the control unit 22 obtains the value of the pixel in the scan position and the value of one pixel adjacent in the scan direction.

In step S705, the control unit 22 calculates an average value, an intermediate value, or the like of the values of the pixels obtained in step S703.

In step S707, the control unit 22 stores the result of the calculation in step S705 into a memory.

In step S709, the control unit 22 updates information of a position to be scanned next on the basis of the scan position and the scan direction. For example, in the case where the reduction rate is 50%, an average value is calculated every two pixels. Consequently, the control unit 22 updates the next pixel in a plurality of pixels as objects of calculation of an average value as the position to be scanned next in accordance with the scan direction.

In step S711, the control unit 22 determines whether all of the pixels included in the scan range have been scanned or not. In the case where the process in step S705 has not been completed on all of positions to be scanned (NO in step S711), the control unit 22 repeatedly performs the processes in step S705 and subsequent steps. In the other case (YES in step S711), the data of the reduced image subjected to the thinning process, which is stored in the memory, is returned.

FIGS. 8A to 8D are diagrams illustrating the scan directions in the thinning process. The control unit 22 detects a deviation of the roll angle of the camera 11 on the basis of information of the acceleration of the camera 11 output from the acceleration sensor 12, corrects the deviation of the roll angle, and performs the thinning process on an image.

Figure 8A:
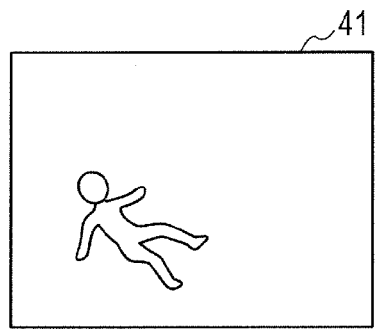
FIGS. 8A to 8D are diagrams illustrating the directions of scans in the thinning process.
Figure 8B:
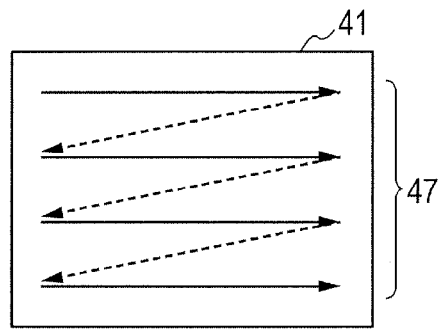

FIG. 8A illustrates an example of the video data 41 in the case where there is no influence of the deviation of the roll angle of the camera 11. FIG. 8B is a diagram illustrating the scan directions in the thinning process in the case where there is no influence of the deviation of the roll angle of the camera 11. As illustrated in FIG. 8B, in the thinning process, the control unit 22 performs a scan on the pixels included in the image while moving the scan position in the horizontal direction as illustrated in scan positions 47. When the scan on one line in an image including a plurality of lines is finished, the control unit 22 continues the scan from the head of the following line.

Figure 8C:
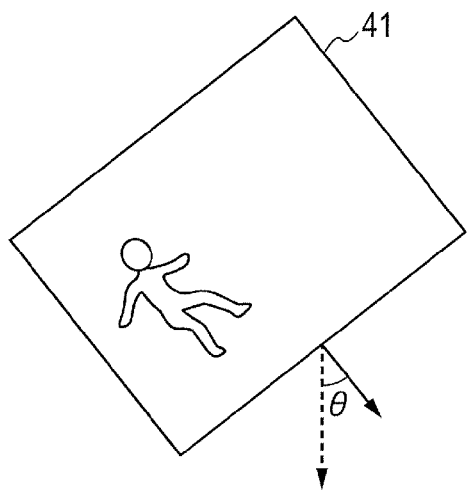

FIG. 8C illustrates an example of the video data 41 in the case where the roll angle of the camera 11 is deviated by the angle θ. The image illustrated in FIG. 8C is influenced by the deviation based on the imaging direction of the camera 11. Consequently, in calculation of the characteristic amount of the motion vector in step S615, to calculate an average value of the components in the gravity force direction, a correction has to be made to eliminate the influence of the deviation of the roll angle of the camera 11. An example of a correcting method is to turn the video data output from the camera 11 in accordance with the deviation of the roll angle of the camera 11. Another correcting method is that the control unit 22 corrects a motion vector calculated by the process in step S607 or the like in accordance with the deviation of the roll angle of the camera 11. As further another correcting method, an average component in the gravity force direction of a motion vector included in a group, calculated as a characteristic amount in the process of step S615 is corrected by the angle θ indicative of the deviation of the roll angle of the camera 11.

Figure 8D:
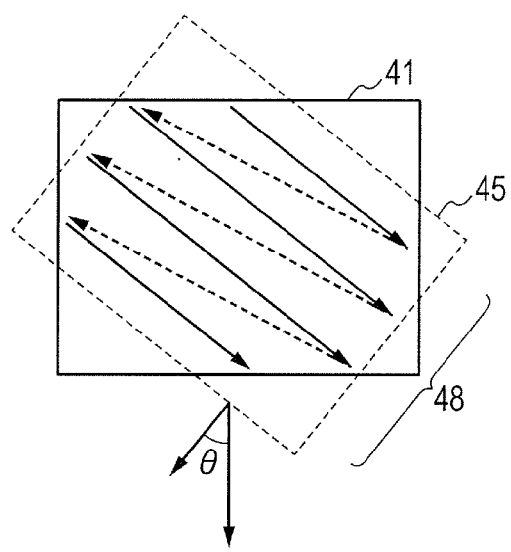

FIG. 8D is a diagram illustrating an example of correcting the scan direction by tilting the scan direction of the image by the control unit 22 in the case where the roll angle of the camera 11 is deviated by the angle θ. For example, the control unit 22 sets a range obtained by turning the video data 41 only by the angle θ from the center point of the image as a range of executing the scan (scan range 45). As illustrated in scan positions 48 in FIG. 8D, the scan directions are tilted in correspondence with the deviation (angle θ) of the roll angle of the camera 11.

In the first embodiment, the control unit 22 corrects the deviation of the roll angle at the time of imaging of the camera 11 by turning the image at a stage before the thinning process in step S605 is executed. In the thinning process, by correcting the deviation of the roll angle of the camera 11 and performing the thinning process on the corrected image, noise other than that in the gravity force direction of the image can be minimized.

Calculation of Motion Vector (step S607)

Figure 9A:
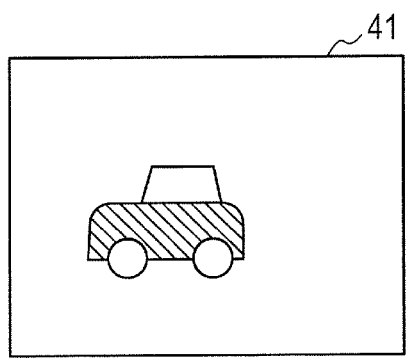
FIGS. 9A to 9C are diagrams illustrating outline of a process of calculating motion vectors of each of blocks of an image.
Figure 9B:
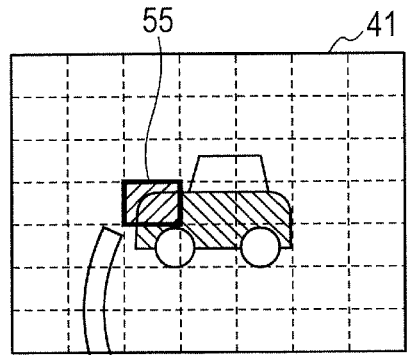
Figure 9C:
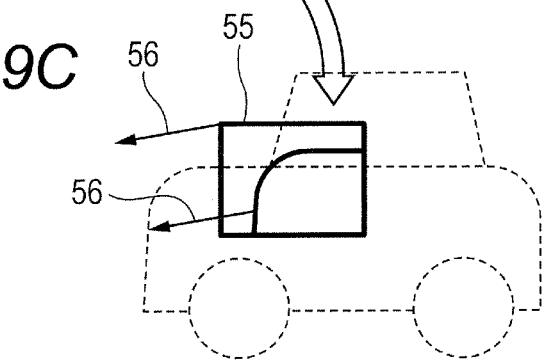

FIGS. 9A to 9C are diagrams illustrating outline of the process of calculating the motion vector of each of blocks of an image. As illustrated in FIGS. 9A to 9C, the motion vector is calculated by referring to a plurality of frames of an image. FIG. 9A is a diagram illustrating an example of an image including the video data 41. FIG. 9B is a diagram illustrating an image after one frame of FIG. 9A and a part of blocks included in the image. FIG. 9C is a diagram illustrating a motion vector calculating method.

As illustrated in FIGS. 9A and 9B, it is assumed that a vehicle is included as a subjected in preceding and subsequent frames. As illustrated in FIG. 9A, it is assumed that a block as an object of calculating a motion vector is a block 55. As illustrated in FIGS. 9B and 9C, the control unit 22 calculates a motion vector by obtaining how much the image included in the block 55 of the present frame is moved from the preceding frame. Concretely, an image included in a block of the present frame to be processed is cut out, and the cut image (window) is moved in parallel using the cut position as a reference. Each time the window is moved, the control unit 22 overlaps the image with the image of the preceding frame and calculates the similarity of the images. The control unit 22 repeatedly calculates the similarity while moving the window and sets a movement position having the highest similarity as a motion vector.

Calculation of Characteristic Amounts (step S615)

With reference to FIG. 10 to FIGS. 13A to 13C, the process of calculating the characteristic amounts of the motion vector of each of blocks included in a group in step S615 will be described. On the basis of the motion vectors of the blocks included in the group, the control unit 22 calculates, as characteristic amounts, the average value of the components in the gravity force direction of the motion vectors, variance of the motion vectors, and the value of the rotation direction component using the block as the gravity center of the blocks included in the group as a center.

FIG. 10 is a flowchart illustrating the process of calculating an average vector of the motion vectors of the blocks included in the group. The control unit 22 specifies a block included in the group with reference to the grouping information 51. The control unit 22 performs a process of calculating an average vector of motion vectors included in the group by calling the process for calculating the average vector of the motion vectors as a characteristic value and passing a set of the motion vectors included in the blocks as parameters.

In step S1001, the control unit 22 sets a vector acc as the value "0" as the initializing process.

In step S1003, the control unit 22 sets a pointer "p" designating a block as the head block in the group as the initializing process.

In step S1005, the control unit 22 reads the motion vector of the block indicated by the pointer "p" and adds it to the vector acc.

In step S1007, the control unit 22 sets the pointer "p" so as to designate the next block in the group.

In step S1009, the control unit 22 determines whether reading of the motion vectors of all of the blocks in the group has been completed or not on the basis of the value of the pointer "p" and the number of blocks in the group. In the case where there is a motion vector which is not subjected to addition (NO in step S1009), the control unit 22 repeats the processes in step S1005 and subsequent steps, thereby performing the process of adding the motion vectors in the group. In the other case (YES in step S1009), the control unit 22 performs the process in step S1011.

In step S1011, the control unit 22 calculates the average vector acc by dividing the vector acc by the number of motion vectors in the group (the number of blocks included in the group) and returns the calculated average vector acc.

Figure 11:
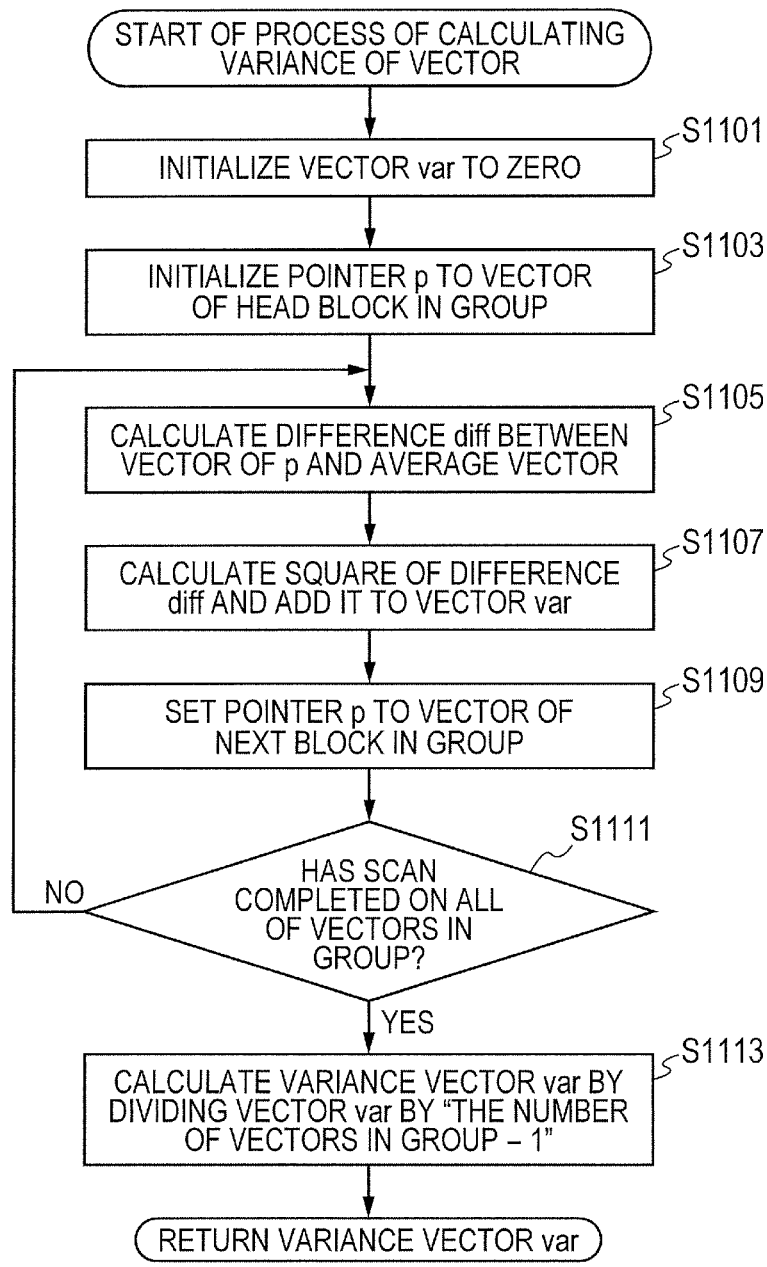
FIG. 11 is a flowchart illustrating processes of calculating, as a characteristic amount, variance of motion vectors, on the basis of the motion vectors of blocks included in a group.

FIG. 11 is a flowchart illustrating processes of calculating, as a characteristic amount, variance of motion vectors, on the basis of the motion vectors of blocks included in a group. The control unit 22 calls a process for calculating variance of motion vectors as a characteristic amount and passes, as parameters, a set of the motion vectors included in the blocks and the average vector acc calculated by the processes illustrated in FIG. 10, thereby performing a process of calculating the variance of the motion vectors included in the group.

In step S1101, the control unit 22 sets the vector var to the value "0" as an initializing process.

In step S1103, the control unit 22 sets the pointer "p" designating a block to the head block in the group.

In step S1105, the control unit 22 reads the motion vector of the block designated by the pointer "p" and calculates the difference diff between the read motion vector and the average vector acc.

In step S1107, the control unit 22 adds the square of the difference diff calculated in step S1105 to the vector var.

In step S1109, the control unit 22 sets the pointer "p" so as to designate the next block in the group.

In step S1111, the control unit 22 determines whether reading of the motion vectors of all of blocks in the group has been completed or not on the basis of the value of the pointer "p" and the number of blocks in the group. In the case where there is a motion vector which is not subjected to addition (NO in step S1111), the control unit 22 repeats the processes in step S1105 and subsequent steps, thereby performing the process of adding the difference diff of the motion vectors in the group. In the other case (YES in step S1111), the control unit 22 performs the process in step S1113.

In step S1113, the control unit 22 calculates the variance Vvar of the vectors by dividing the vector var by the value "(the number of blocks included in the group)−1" and returns the calculated variance Vvar.

Figure 12:
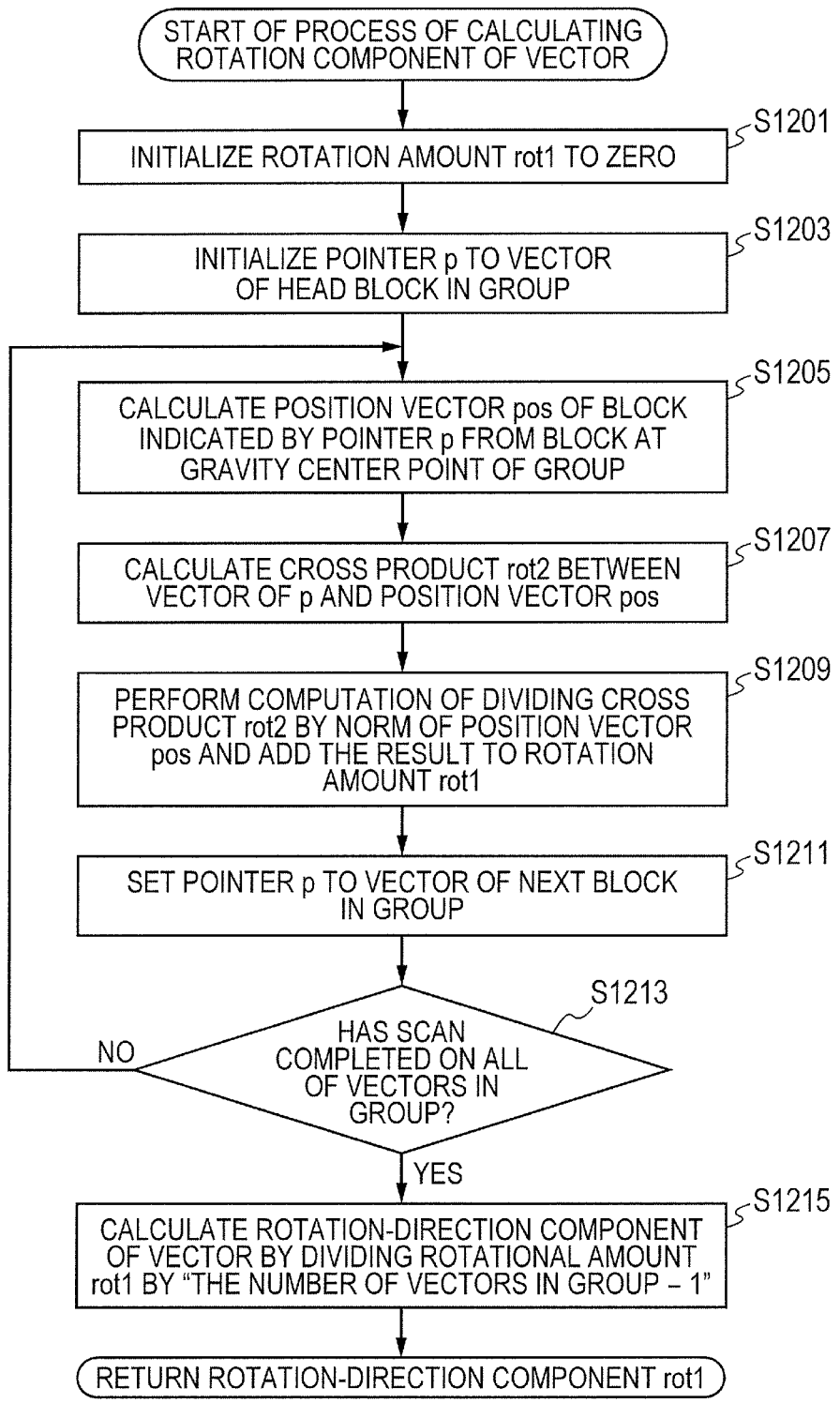
FIG. 12 is a flowchart illustrating processes of calculating a value of a component of a rotation direction made by a motion vector of each block on the basis of the motion vectors of blocks included in the group.

FIG. 12 is a flowchart illustrating processes of calculating the value of a rotation direction component made by a motion vector of each block on the basis of the motion vectors of blocks included in the group. The control unit 22 calls a process for calculating the value of the rotation direction component of a motion vector in a group as a characteristic amount and performs a process of calculating the rotation direction component by passing a set of the motion vectors of the blocks included in the group and the block as the center of gravity of the group as parameters.

In step S1201, the control unit 22 sets a rotational amount rot1 to the value "0" as the initializing process.

In step S1203, the control unit 22 sets the pointer "p" designating a block to the head block in the group.

In step S1205, the control unit 22 calculates a position vector pos to the block indicated by the pointer "p" using the block as the center of gravity as a center.

In step S1207, the control unit 22 calculates a cross product rot2 of the motion vector indicated by the pointer "p" and the position vector pos extending from the block as the center of gravity to the block indicated by the pointer "p".

In step S1209, the control unit 22 performs a computation of dividing the cross product rot2 by the norm of the position vector pos and adds the computation result to the rotation amount rot1.

In step S1211, the control unit 22 sets the pointer "p" so as to designate the next block in the group.

In step S1213, the control unit 22 determines whether reading of the motion vectors of all of the blocks in a group has been completed or not on the basis of the value of the pointer "p" and the number of blocks in the group. In the case where there is a motion vector which is not subjected to the computation of the rotation amount (NO in step S1213), the control unit 22 repeats the processes in step S1205 and subsequent steps, thereby performing the process of calculating the rotation amount of each of the blocks. In the other case (YES in step S1213), the control unit 22 performs the process in step S1215.

In step S1215, the control unit 22 calculates the rotation direction component rot1 made by the motion vector of each of the blocks of the group by dividing the rotation amount rot1 by the value "(the number of blocks included in the group)−1" and returns the calculated rotation direction component rot1.

Figure 13A:
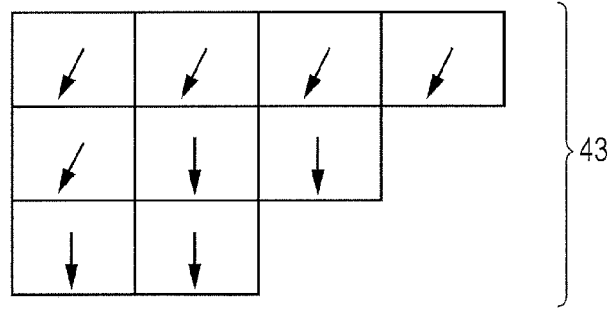
FIGS. 13A to 13C are diagrams illustrating an example of distribution of the motion vectors of blocks included in a group.
Figure 13B:
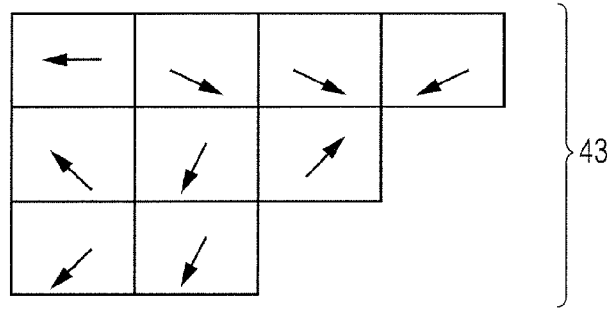
Figure 13C:
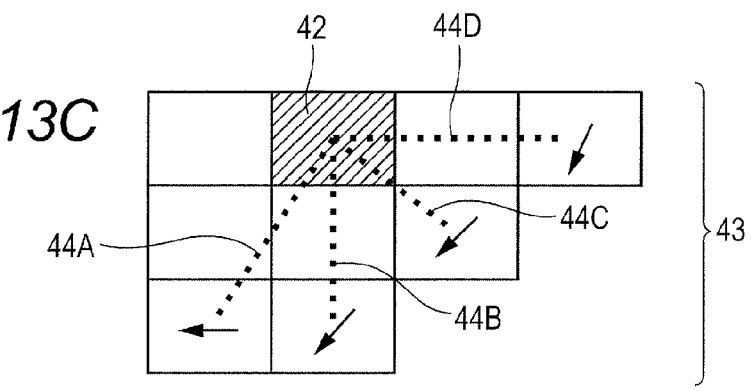

FIGS. 13A to 13C are diagrams illustrating an example of distribution of the motion vectors of blocks included in a group. As illustrated in FIG. 13A, in the case where the motion vectors of the blocks included in the pixel block group 43 are aligned in the gravity force direction, the possibility that the person 500 to be observed drops or falls is relatively high. Consequently, in the case where the average value of the components in the gravity force direction of the motion vectors included in the group is relatively large, the possibility that the person 500 to be observed drops or falls is high. On the other hand, as illustrated in FIG. 13B, in the case where variance of the motion vectors of the blocks included in the pixel block group 43 is large, the possibility of noise is high. As illustrated in FIG. 13C, in the case where the rotation direction components made by the motion vectors of the blocks included in the pixel block group 43 are large, the possibility that the person 500 to be observed drops or falls is high. In FIG. 13C, a gravity-center block 42 including the center of gravity of the pixel block group 43 is set as the center, and examples of the position vectors in the blocks are shown as position vectors 44A, 44B, 44C, and 44D. On the basis of the motion vectors of the blocks and the position vectors of the blocks indicated as the position vectors 44A and the like, the control unit 22 calculates the values of the rotation direction components of the motion vectors around the gravity-center block 42 as a center (in FIG. 13C, the motion vectors of part of the blocks are illustrated).

Informing Control Process

When the control unit 22 outputs a signal indicating that the person 500 to be observed is in an abnormal motion state (for example, sets a flag indicative of the abnormal state of the person 500 to be observed) by the process illustrated in step S623 in FIG. 6, the control unit 22 controls a process for informing an abnormal state of the person 500 to be observed by the informing unit 16.

Figure 14:
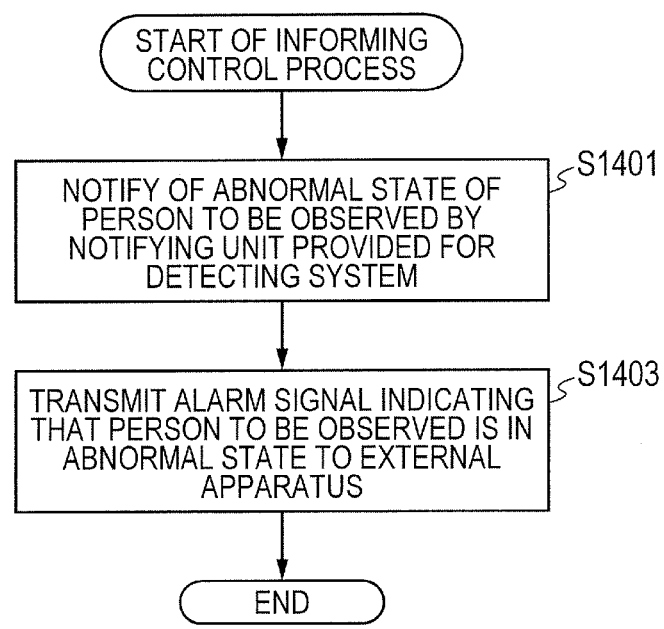
FIG. 14 is a flowchart illustrating processes of detecting the state of an abnormal motion of the person 500 to be observed by the detecting system 100.

FIG. 14 is a flowchart illustrating processes of informing the state of an abnormal motion of the person 500 to be observed by the detecting system 100. For example, in the case where the process of step S623 in FIG. 6 is performed, the control unit 22 performs the process illustrated in FIG. 14.

In step S1401, the MCU 17 instructs the notifying unit 14 to notify of the abnormal motion state of the person 500 to be observed. The notifying unit 14 outputs a signal indicating that the person 500 to be observed drops by a visual method (for example, display of information to the display), an auditory method (for example, sound output by a speaker), or other methods.

In step S1403, the MCU 17 outputs a signal indicating that the person 500 to be observed is in the abnormal motion state to the alarm apparatus 800, the communication apparatus 900, and other apparatuses via the communication module 15. For example, the alarm apparatus 800 receives the signal from the communication module 15 and outputs sound of alarm. For example, the communication apparatus 900 is a radio communication terminal, receives data transmitted from the detecting system 100, and informs of the fact that the person 500 to be observed is in the abnormal motion state by a display, a speaker, or the like.

SUMMARY OF FIRST EMBODIMENT

The ratio of a drop and a fall is relatively high in unexpected accidents which occur in the home. Particularly, in the case of elderly people, a place where a drop or fall occurs is often a relatively flat place such as a living room or a hospital room. It is consequently desirable to efficiently find that a person to be observed is in a drop or fall state and to enable early handling.

In the detecting system 100 of the first embodiment, in a process of imaging a person to be observed by the camera, calculating a motion vector from a captured image and, on the basis of the size of the motion vector of the person to be observed, detecting a drop or fall of the person to be observed, by the functions of the thinning processing unit 32, the motion vector calculating unit 33, the flow vector threshold processing unit 34, the labeling unit 35, and the characteristic amount calculating unit 36, a situation that an abnormal state of the person to be observed is erroneously detected due to a motion of a background image, camera noise, a change in brightness, or the like is avoided. By calculating the characteristic amounts by the characteristic amount calculating unit 36 and determining the state of the person 500 to be observed by the characteristic amount calculating unit 36 on the basis of the characteristic amount, the possibility that the detecting system 100 detects a complicated motion accompanying a drop of the person 500 to be observed increases.

According to the detecting system 100 of the first embodiment, without requiring the person to be observed to wear or carry a sensor unit or the like, the state of the person to be observed can be observed continuously and, in the case where a drop or fall occurs, it can be notified automatically. That is, by the detecting system 100 of the first embodiment, without applying large burden on the person to be observed, monitoring can be performed always in daily life.

According to the detecting system 100 of the first embodiment, the person to be observed himself/herself does not have to transmit information indicating that he/she is in an abnormal motion state. Consequently, for example, in the case where the person to be observed suddenly loses consciousness or even in the case where the person to be observed drops due to an unexpected external force, the information is automatically detected and notified to an external apparatus and the like.

According to the detecting system 100 of the first embodiment, a block is selected by comparing the threshold and the size of a motion vector in the image including the video data 41. The detecting system 10 groups blocks and performs calculation of the characteristic amounts of the motion vectors of the blocks of each group as objects. In such a manner, while separating the motion of an object other than the person to be observed and unnecessary for detection of the state of the person to be observed (for example, the motion of a curtain in a room), the state of the motion of the person to be observed can be detected. Also in an object whose characteristic of its surface is small such as a white wall, noise of a motion vector may occur due to a change in brightness of the camera, shadows, and the like. In the detecting system 100 of the first embodiment, the influence of them can be also separated. Consequently, the detecting system can detect an abnormal state of the person to be observed with high precision. The detecting system 10 sets priority for the blocks grouped on the basis of the areas of the blocks included in the group, calculates the characteristic amounts in descending order of the area, and determines the state of the motion of the person to be observed. Therefore, in the case where a plurality of groups are detected from an image, prior to calculation of a characteristic amount of a relatively small group which is assumed to have no relation, a characteristic amount of a group which is assumed to be the person to be observed can be calculated, and the speed of the process of detecting the state can be increased.

The detecting system can realize protection of privacy of the person to be observed by, for example, not transmitting an image until an abnormal state of the person to be observed is detected. Consequently, the person to be observed does not have to be aware of observation by a camera in daily life so that psychological burden can be reduced.

In the case where an abnormal state of the person to be observed is detected, the detecting system can extract the image of a block determined to be in an abnormal state and transmit it to an external apparatus or the like. In such a manner, privacy of the person to be observed can be protected.

Second Embodiment

With reference to FIGS. 15 to 18, a detecting system of a second embodiment will be described. In the detecting system of the second embodiment, in the case where a plurality of subjects are included in a captured image and grouped by the labeling unit 35, whether a subject in a group makes an abnormal motion or not is detected, and an alarm level indicative of the degree of the abnormal state is output. The detecting system outputs the alarm level on the basis of the number of groups included in the image, a result of calculation of characteristic amounts of each group, the area of the group, and the like.

FIGS. 15A to 15F are diagrams illustrating an example of the state of a drop or fall of a person to be observed.

Figure 15A:
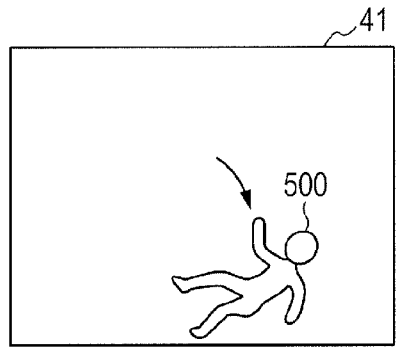
FIGS. 15A to 15F are diagrams illustrating an example of the state of a drop or fall of a person to be observed.

FIG. 15A illustrates an example that the person 500 to be observed is alone and drops. For example, the number of groups extracted from an image is one and the number of groups detected as a drop of the person 500 to be observed by calculation of the characteristic amounts and the like is one. In this case, there is the possibility that the person 500 to be observed is alone and drops or falls, so that the control unit 22 sets the level of alarm to "high" indicating that the alarm level is high and sets the class of the state to the alarm class "1". Further, in the case where there is no large change in the motion vectors and there is no motion of the person 500 to be observed after the detection that the person 500 to be observed is along and drops or falls, the control unit 22 may set the alarm level to a higher level.

Figure 15B:
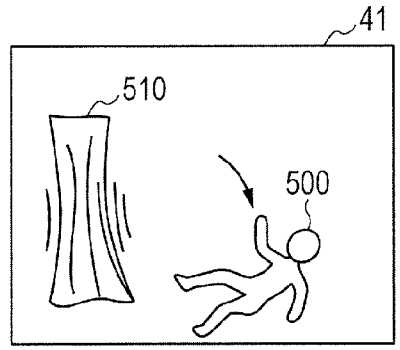

FIG. 15B illustrates an example that the person 500 to be observed is alone and drops and an image includes a background object such as a subject 510. For example, the number of groups extracted from an image is plural, the number of groups detected as a drop of the person 500 to be observed by calculation of characteristic amounts and the like is one, and the other groups have large variance and are not detected as a drop. In this case, in a manner similar to the situation of FIG. 15A, the control unit 22 sets the alarm level to "high" and sets the alarm class to "2". In the case where variance of the group is large, the control unit 22 regards that the group having the large variance indicates a background object or the like, not the person 500 to be observed, and can ignore it in detection of the state of the motion of the person 500 to be observed.

Figure 15C:
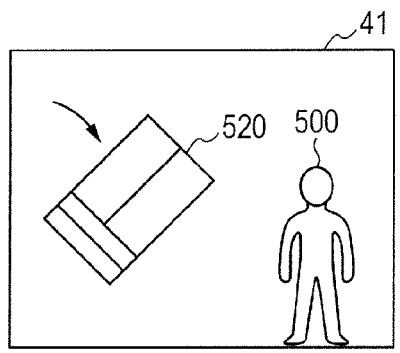

FIG. 15C is a diagram illustrating an example that the person 500 to be observed is alone and a subject 520 as a background object other than the person 500 to be observed drops. The detecting system 100 may detect that a group is a person or a background object by comparing the area of each of groups formed with a threshold larger than the area of a person. In the case where it is detected that a background subject drops in the situation illustrated in FIG. 15C, the control unit 22 estimates that it is not urgent but is dangerous and the person to be observed needs help, and sets the alarm level "middle" indicating that the alarm level is an intermediate level and the alarm class "3A". In the case where it is detected that a group indicating a person drops after the detection that the background object falls, or in the case where the group indicating a person merges with the group of the background object detected to be dropped, the control unit 22 sets the alarm level "high" and the alarm class "3B".

Figure 15D:
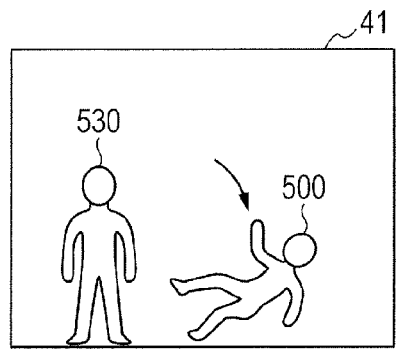

FIG. 15D is a diagram illustrating an example that when there is a person (subject 530) other than the person 500 to be observed and there are a plurality of persons, a subject belonging to any group drops. For example, there are a plurality of groups extracted from an image and the number of groups detected as a drop of the person 500 to be observed is one. In this case, the control unit 22 sets the alarm level "low" indicating that the alarm level is low and the alarm class "4A". In the case where no motion in each group is detected after detection of a drop of one group (for example, the size of a motion vector of a block group included in the group is smaller than a threshold in an image for a predetermined period (which may be, for example, a few seconds), the control unit 22 estimates that the person to be observed needs help and sets the alarm level "high" and the alarm class "4B".

Figure 15E:
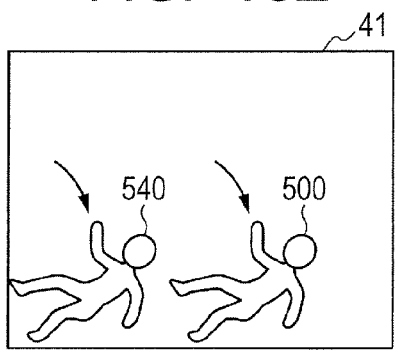

FIG. 15E is a diagram illustrating an example that a plurality of persons such as the person 500 to be observed and a subject 540 drop at the same time. For example, it is a case where the number of groups extracted from an image is plural, and the number of groups detected as a drop of a person is plural. In this case, the control unit 22 sets the alarm level "high" and the alarm class "5".

Figure 15F:
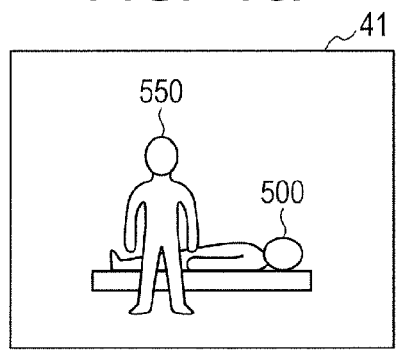

FIG. 15F is a diagram illustrating an example that subjects are close to each other and the case where the control unit 22 detects that the number of groups included in the image is one and the area exceeds a threshold, or the case where the number of groups is plural and the distance between the groups is close. In this case, it is estimated that a subject 550 as a person such as a caretaker exists close to the person to be observed in the same room, and the control unit 22 sets the alarm level "low" and the alarm class "6".

As described above, the detecting system outputs the alarm level indicative of the level of alarm and the alarm class indicative of the class of the situation on the basis of the number of groups included in an image, a result of calculation of a characteristic amount of each group, and the like, and holds them in a memory or the like. Consequently, the detecting system can inform the situation of a motion of a person to be observed in accordance with the alarm level and the alarm class with reference to the alarm level and the alarm class held in the memory or the like. For example, the detecting system can switch sound output from the speaker, display content in the display, or the like in accordance with the alarm level. The detecting system can display the situation of a motion of the person to be observed on the display in accordance with the alarm class.

Figure 16:
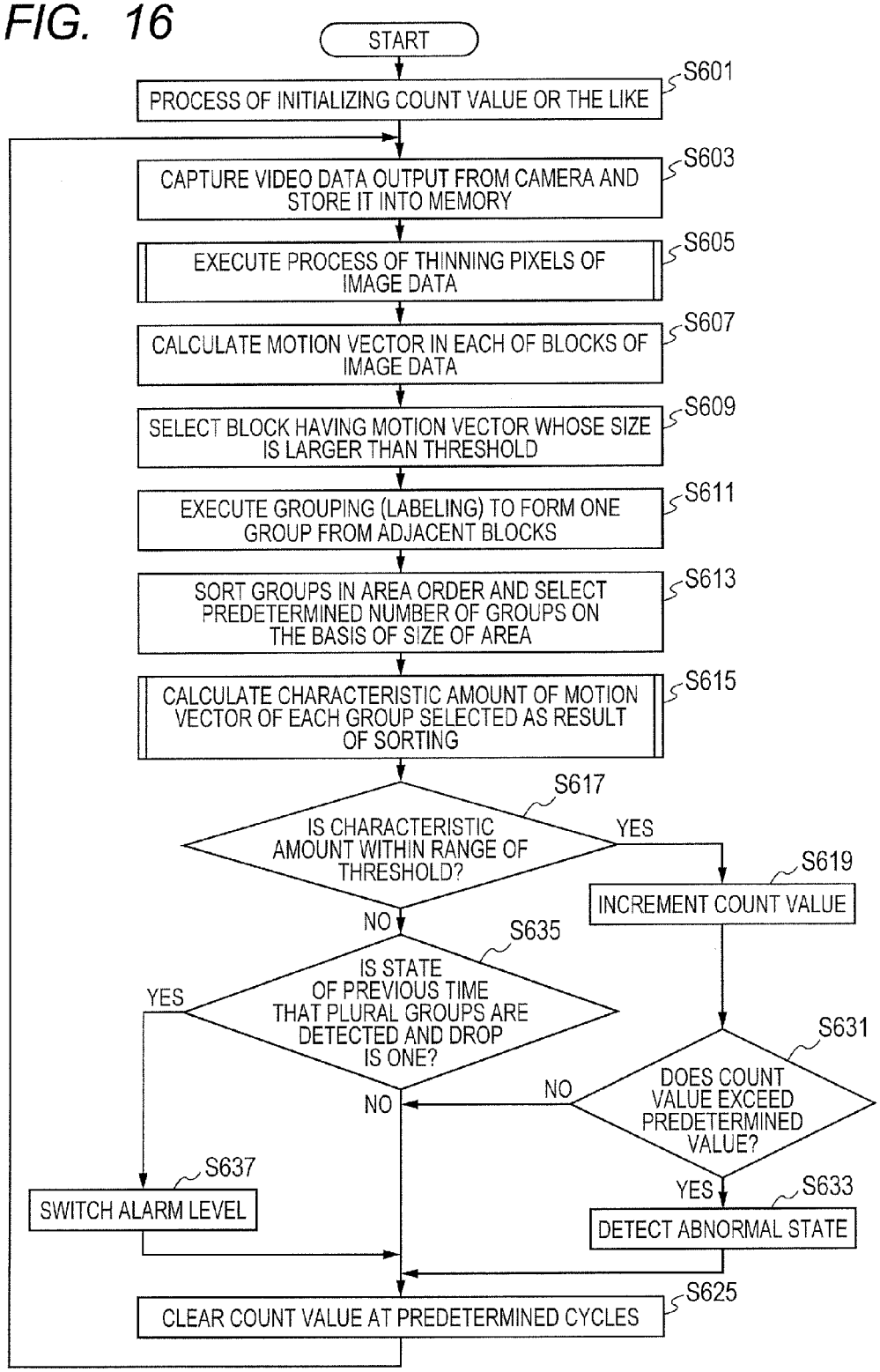
FIG. 16 is a flowchart illustrating processes of a drop or fall of the person 500 to be observed on the basis of an image captured by the camera 11 by a detecting apparatus 200 of a second embodiment.
Figure 17:
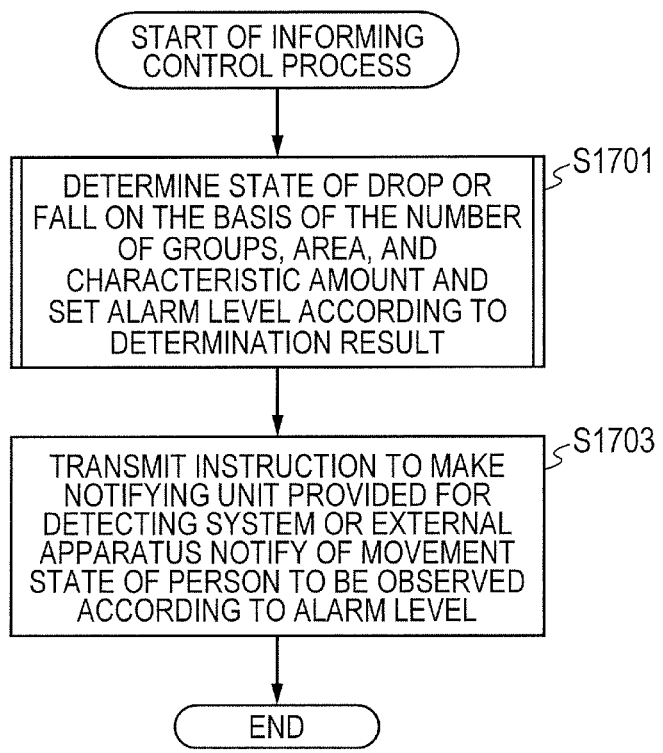
FIG. 17 is a flowchart illustrating processes that the control unit 22 informs that the person 500 to be observed is in an abnormal motion state.
Figure 18:
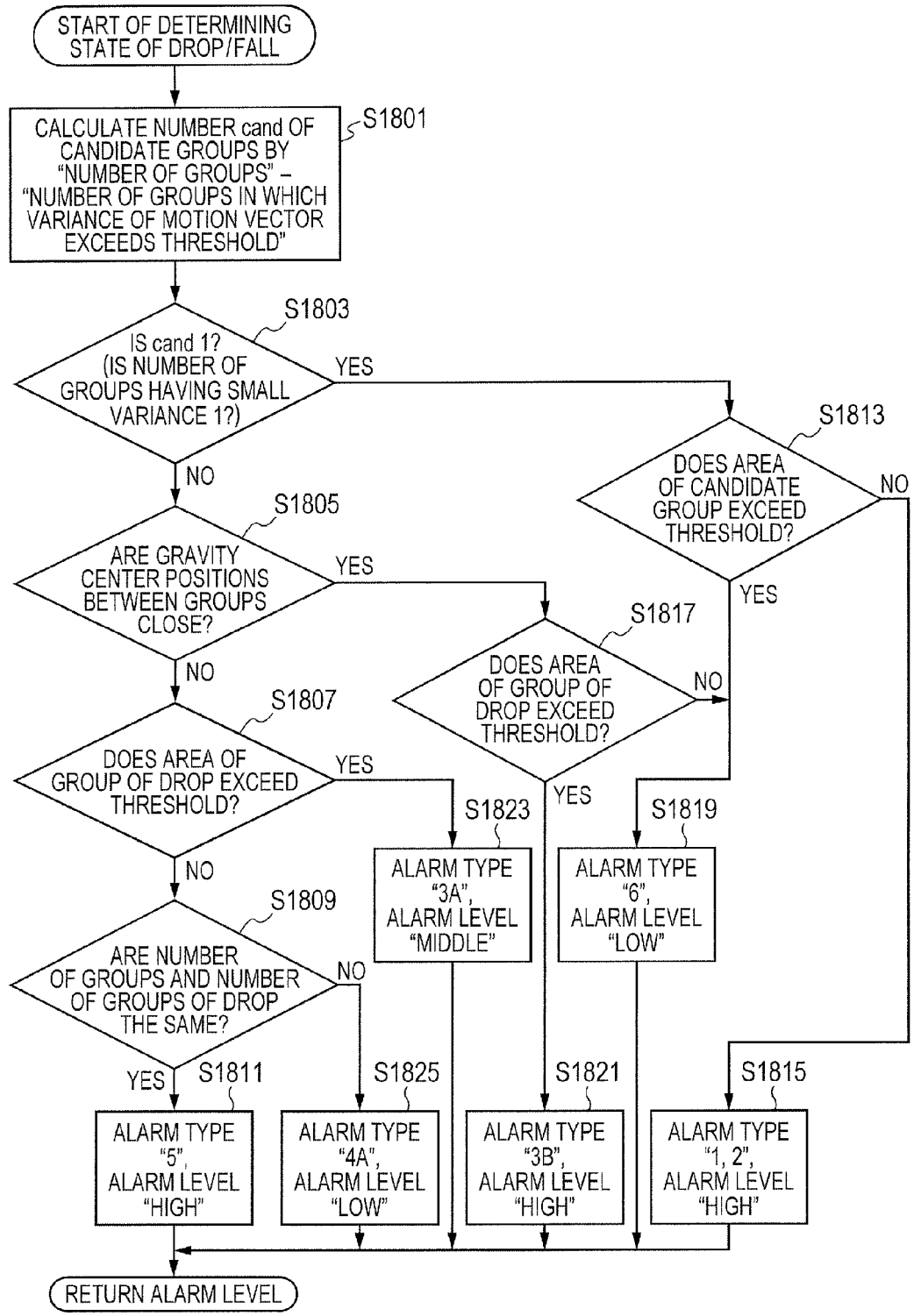
FIG. 18 is a flowchart illustrating processes of determining a situation of a drop or fall of the person 500 to be observed.

With reference to FIGS. 16 to 18, the operation of the detecting system of the second embodiment will be described. FIG. 16 is a flowchart illustrating processes of a drop or fall of the person 500 to be observed on the basis of an image captured by the camera 11 by the detecting apparatus 200 of the second embodiment. Since the processes from step S601 to step S619 are similar to those described in the first embodiment, their description will not be repeated. After the control unit 22 updates the counter value in step S619, the control unit 22 performs the process in step S631.

In step S631, the control unit 22 determines whether the value of the counter exceeds a predetermined value (whether a period in which a characteristic amount of a group lies in the range of the threshold exceeds a predetermined frame). In the case where the value of the counter exceeds the predetermined value (YES in step S631), the control unit 22 performs the process in step S633. In the other case (NO in step S631), the control unit 22 performs the process in step S625.

In step S633, the control unit 22 outputs a signal indicating that the person 500 to be observed is in an abnormal motion state.

In the case where the control unit 22 calculates the characteristic amount of each group and a determination value D is not in the range of the threshold in step S617 (NO in step S617), the control unit 22 performs the process in step S635.

In step S635, the control unit 22 refers to the alarm class in the case where it was informed last time that the state of the motion of the person 500 to be observed is abnormal. When the situation of the motion of the person to be observed is the case where a plurality of groups are detected and the number of groups detected as a drop is one (alarm class 4A) (YES in step S635), the control unit 22 performs the process in step S637. In the other case (NO in step S635), the control unit 22 performs the process in step S625.

In step S637, the control unit 22 switches to the alarm level "high" and the alarm class "4B" and stores them in the memory or the like. The situation corresponds to the case where the control unit 22 detects a plurality of groups, the number of groups detected as a drop is one and, after that, there is no motion in each group, and there is the possibility that the person to be observed needs help. A counter may be prepared to provide a predetermined period until the alarm class "4A" is switched to the alarm class "4B", and the control unit 22 may increment the counter value each time the process in step S637 is performed and, when the counter value reaches a predetermined value, switch the alarm class.

FIG. 17 is a flowchart illustrating processes that the control unit 22 informs that the person 500 to be observed is in an abnormal motion state. The processes illustrated in FIG. 17 are, for example, called when the control unit 22 performs the process in step S633 in FIG. 16 or may be periodically performed by the control unit 22.

In step S1701, referring to the grouping information 51 and the characteristic amount information 52, the control unit 22 determines a situation that the person 500 to be observed drops or falls on the basis of the number of groups, the areas of the groups, and the characteristic amounts of the groups and sets the alarm level and the alarm class in accordance with the determination result. The details of the process will be described later with reference to FIG. 18.

In step S1703, the control unit 22 notifies of the state of the motion of the person 500 to be observed in accordance with the alarm level and the alarm class by the notifying unit 14 or the like.

FIG. 18 is a flowchart illustrating the processes of determining the situation of a drop or fall of the person 500 to be observed. The processes in FIG. 18 correspond to the process of step S1701 in FIG. 17.

In step S1801, the control unit 22 refers to the characteristic amount information 52, calculates the difference between the number of groups included in an image and the number of groups in which variance of motion vectors included in the groups exceeds the threshold, and stores the calculation result as a variable cand indicative of the number of candidates of groups including a person. Since there is the possibility that a group in which the variance exceeds the threshold is not a person but noise, the influence of the group detected by noise is eliminated from the total number of groups included in the image.

In step S1803, the control unit 22 determines whether the number of groups after the noise is eliminated is one or not. The control unit 22 determines whether the variable cand is the value "1" or not, that is, whether the number of groups in which the variance of motion vectors included in the groups is small is one or not. In the case where the variable cand is the value "1" (YES in step S1803), the control unit 22 performs the process of step S1813. In the other case (NO in step S1803), the control unit 22 performs the process of step S1805.

In step S1805, referring to the grouping information 51, the gravity center position is calculated for each of the plurality of groups, and whether the gravity center positions of the groups are closed to each other by predetermined distance or less is determined. For example, in the case where the gravity center positions of the groups is a few percent or less or tens percent or less of the total number of blocks in the horizontal direction in an image, it is determined that the gravity center positions of the groups are close to each other by the predetermined distance or less. A threshold to be compared with the interval between the gravity center positions of groups is set so that, for example, in the case where persons are positioned close to each other by the distance of a few meters, the gravity center positions of the groups in the image are determined to be close to each other by the predetermined distance or less. In the case where it is determined that the gravity center positions of the groups are close to each other by the predetermined distance or less (YES in step S1805), the control unit 22 performs the process of step S1817. In the other case (NO in step S1805), the control unit 22 performs the process of step S1807.

In step S1807, the control unit 22 determines that a subject shown in a group is a person or a background object such as furniture on the basis of the area of the group determined as a drop. Referring to the grouping information 51, the control unit 22 obtains the area of the group in which the determination value D is determined to be within the threshold in the process of the step S617 on the basis of the characteristic amounts of the groups and it is determined that the person 500 to be observed drops or falls. The control unit 22 determines whether the area of the obtained group exceeds the threshold or not and, in the case where it is determined that the area exceeds the threshold (YES in step S1807), performs the process of step S1823. In the other case (NO in step S1807), the control unit 22 performs the process of step S1809.

In step S1809, the control unit 22 determines whether all of the groups included in the image indicate a drop or not. The control unit 22 determines whether the number of groups indicated by the variable cand and the number of groups determined as a drop match or not. In the case where it is determined that the numbers match (YES in step S1809), the control unit 22 performs the process of step S1811. In the other case (NO in step S1809), the control unit 22 performs the process of step S1825.

In step S1811, the control unit 22 sets the alarm class "5" and the alarm level "high".

In step S1813 (in the case of YES in step S1803), the control unit 22 determines whether the group indicates a person such as the person 500 to be observed or a background object such as furniture. The control unit 22 calculates the area of a group having small variance with reference to the grouping information 51 and determines whether the area of the group has a predetermined size as compared with a threshold. The threshold to be compared with the area of a group may be set so that a person and a background object such as furniture whose size is different from a person can be discriminated from each other in an image. In the case where the area of the group having small variance exceeds the predetermined size (YES in step S1813), the control unit 22 performs the process of step S1819. In the other case (NO in step S1813), the control unit 22 performs the process of step S1815.

In step S1815, the control unit 22 sets the alarm class "1" or "2" and sets the alarm level "high". For example, in the case where one group is detected from an image and is determined that it indicates a drop or fall, the control unit 22 sets the alarm class "1". In the case where a plurality of groups are detected from an image and one of them is determined as a group indicating a drop or fall, the control unit 22 sets the alarm class "2".

In step S1817 (NO in step S1805), the control unit 22 determines whether the group determined as a group indicating a drop or fall expresses a person or a background object such as furniture whose size is different from a person. The control unit 22 obtains the area of the group determined as a group indicating a drop or fall with reference to the grouping information 51. The control unit 22 determines whether the obtained area exceeds the threshold or not and, in the case where it is determined that the area exceeds the threshold (YES in step S1817), performs the process of step S1821. In the other case (NO in step S1817), the control unit 22 determines the process of step S1819.

In step S1819, the control unit 22 sets the alarm class "6" and the alarm level "low".

In step S1821, the control unit 22 sets the alarm class "3B" and the alarm level "high".

In step S1823 (YES in step S1807), the control unit 22 sets the alarm class "3A" and the alarm level "middle".

In step S1825 (NO in step S1809), the control unit 22 sets the alarm class "4A" and the alarm level "low".

As described above, the detecting system of the second embodiment can determine the degree of an abnormal state of a person to be observed. The detecting system can notify an observing person such as a caretaker or a family member of an abnormal state of a person to be observed by visually, aurally, or other various methods in accordance with various states of the person to be observed such as a serious state and a non-emergency state. By knowing the degree of the abnormal state of the person to be observed, the observer can easily determine whether handling is immediately necessary or not, and the burden is lessened. The detecting system can also control whether an image is notified or not in accordance with the degree of the abnormal state of the person to be observed. In this case, privacy protection can be realized in accordance with the state of the person to be observed.

Third Embodiment

A detecting system of a third embodiment will be described. The detecting system of the third embodiment corrects a deviation in the imaging direction of the camera 11 in accordance with the tilt of the camera 11.

Figure 19A:
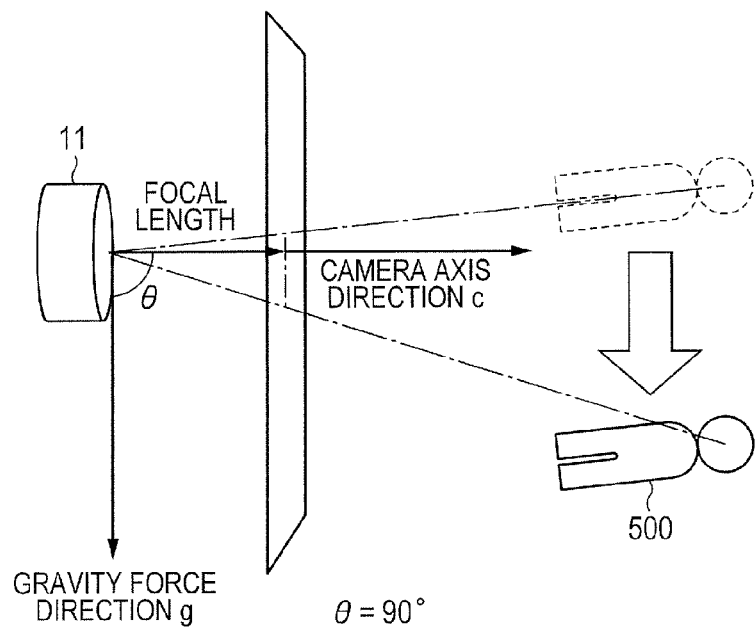
FIGS. 19A and 19B are diagrams illustrating a deviation of a pitch angle when the camera 11 is installed.
Figure 19B:
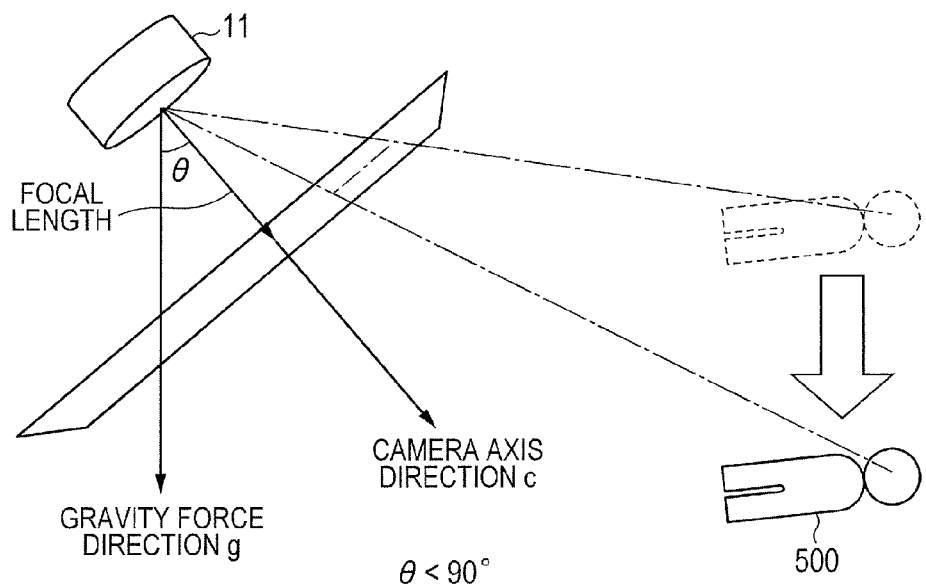

FIGS. 19A and 19B are diagrams illustrating a deviation of a pitch angle when the camera 11 is installed. In FIGS. 19A and 19B, the angle formed by a vector in the imaging axis direction of the camera and a vector in the gravity force direction is set as an angle θ. The control unit 22 receives an output value of the acceleration sensor 12 and, on the basis of the received acceleration of the camera 11, calculates the angle θ between the vector in the imaging axis direction of the camera and the vector in the gravity force direction.

FIG. 19A is a diagram illustrating the case where the vector in the gravity force direction and the vector in the imaging axis direction of the camera form an almost 90 degrees (the angle θ is 90 degrees). In this case, when the person 500 to be observed drops, the motion vector is directed downward (the gravity force direction) of an image captured by the camera 11. The case where the vector in the gravity force direction and the vector in the imaging axis direction of the camera form an almost 90 degrees as illustrated in FIG. 19A is set as a reference. FIG. 19B is a diagram illustrating the case where the vector in the gravity force direction and the vector in the imaging axis direction of the camera form an angle θ (θ<90 degrees). When the person 500 to be observed drops, the drop of the person 500 to be observed is a motion in the gravity force direction. However, in an image captured by the camera 11, the drop is a motion in which the deviation between the gravity force direction and the imaging axis direction of the camera is reflected. Consequently, by correcting the motion vector in the image captured by the camera 11 on the basis of the angle θ, the deviation of the pitch angle of the camera 11 can be corrected. The control unit 22 multiplies the motion vector with a correction factor for correcting the deviation of the pitch angle in a process of calculating the motion vector illustrated in step S607 in FIG. 6 or the process of calculating a characteristic amount of the motion vector in step S615.

Figure 20:
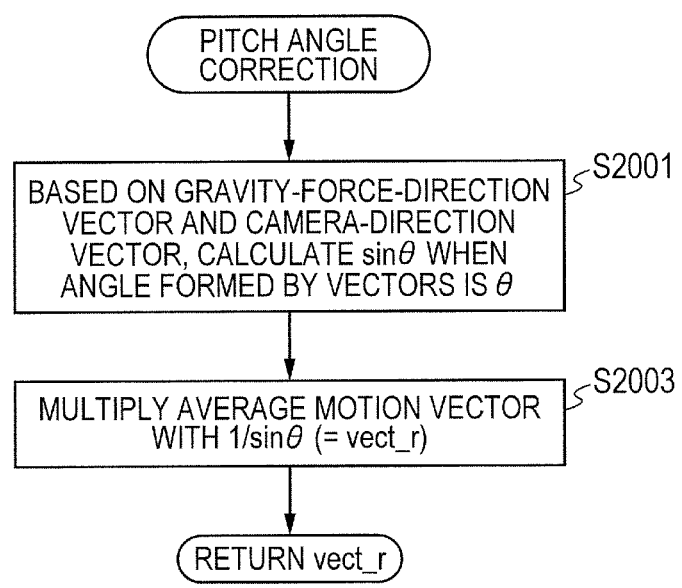
FIG. 20 is a flowchart illustrating processes for correcting a motion vector on the basis of a deviation of the pitch angle of the camera.

FIG. 20 is a flowchart illustrating processes for correcting a motion vector on the basis of a deviation of the pitch angle of the camera. For example, in the case where the control unit 22 calculates an average vector of motion vectors of blocks included in a group in step S615 in FIG. 6, using the calculated average vector and the angle θ formed by the imaging axis direction of the camera 11 and the gravity force direction as parameters, the processes illustrated in FIG. 20 are executed.

In step S2001, the control unit 22 calculates sin θ on the basis of the parameter of the angle θ formed by the imaging axis direction of the camera 11 and the gravity force direction.

In step S2003, the control unit 22 multiplies the average vector acc with the value 1/sin θ to thereby calculate a correction vector vect_r obtained by correcting the average vector acc and returns the calculated correction vector vect_r.

As described above, in the detecting system of the third embodiment, by correcting the motion vector in accordance with the deviation of the pitch angle of the camera, also in the case where the pitch angle of the camera is deviated, precision of detection of a drop or fall of the person 500 to be observed can be increased. Consequently, the flexibility of installation of the camera is increased.

Fourth Embodiment

A detecting system of a fourth embodiment will be described. The detecting system of the fourth embodiment performs a correction in accordance with the distance from the camera 11 to a subject.

Figure 21A:
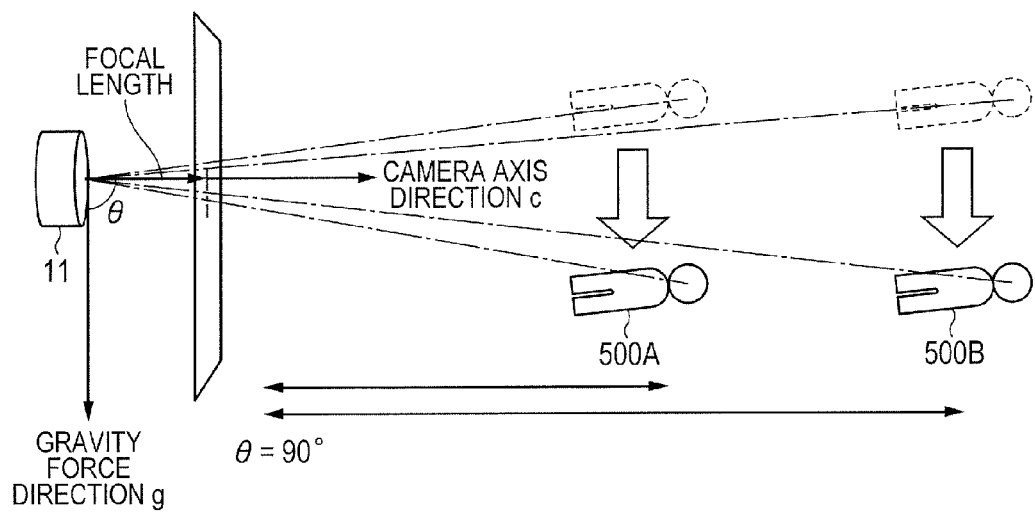
FIGS. 21A and 21B are diagrams illustrating the difference between the camera 11 and a subject and a captured image.
Figure 21B:
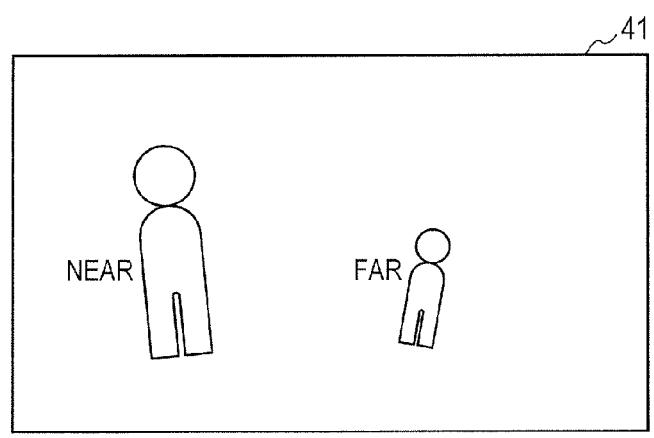

FIGS. 21A and 21B are diagrams illustrating the distance difference between the camera 11 and a subject and a captured image. According to the length of the distance from the camera 11 to the subject, the size of the subject in an image captured by the camera 11 varies. The further the subject from the camera 11 is, the smaller the subject in the image captured by the camera 11 becomes. Consequently, in the case where the subject is far from the camera 11, a motion vector of the subject tends to become smaller than that of a subject closer to the camera 11. Therefore, the detecting system of the fourth embodiment corrects the size of the motion vector in accordance with the distance between the camera 11 and the subject.

FIG. 21A is a diagram illustrating the relations between the camera 11 and the subjects (persons 500A and 500B to be observed). FIG. 21B is a diagram illustrating an example of a captured image. In FIG. 21B, the size of a subject varies in accordance with the distance between the camera 11 and the subject. In the case where the installation position of the camera 11 is fixed, in an image captured by the camera 11, the area of a group of the persons 500A and 500B to be observed is according to the distance between the camera 11 and the person 500A to be observed and the distance between the camera 11 and the person 500B to be observed. Therefore, the control unit 22 estimates the distance between the camera 11 and each of the subjects (the persons 500A and 500B to be observed) on the basis of the area of the group. According to the result of estimation of the distance between the camera 11 and each of the subjects, for example, the control unit 22 may correct a threshold to be compared with the determination value D calculated on the basis of the characteristic amount of the group in step S617. For example, the size of a motion vector in a captured image, of a subject which is relatively far from the camera 11 is relatively small, so that the threshold to be compared with the determination value D may be decreased.

In the detecting system of the fourth embodiment, by making a correction according to the distance between the camera 11 and the subject, the precision of detection of a drop or fall of the person 500 to be observed can be increased.

Fifth Embodiment

A detecting system of a fifth embodiment will be described. The detecting system 100 is provided with a microphone. By receiving an input of sound by the microphone, in the case where a change in the input level of the microphone is large, it is easier to detect that the person 500 to be observed is in an abnormal state.

Figure 22:
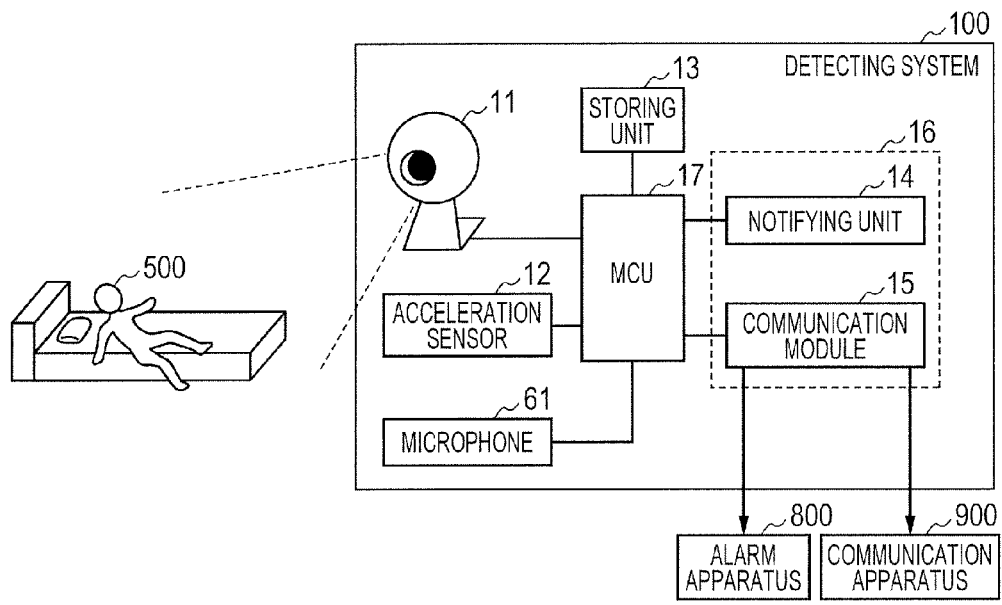
FIG. 22 is a block diagram illustrating the configuration of a detecting system of a fifth embodiment.
Figure 23:
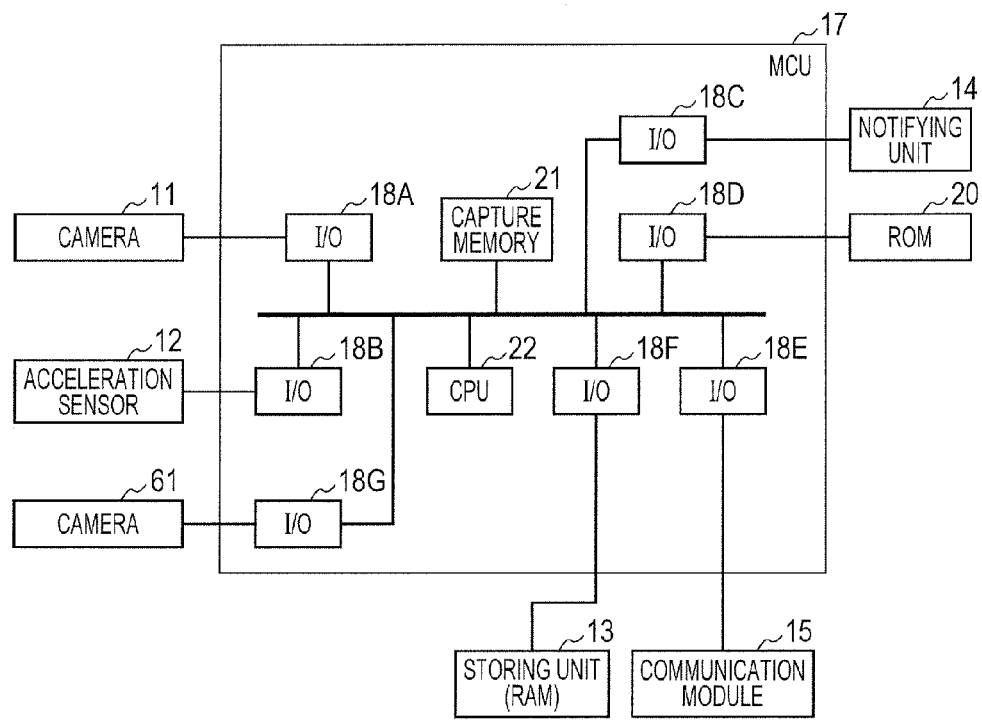
FIG. 23 is a block diagram illustrating a detailed configuration of the MCU 17 of the fifth embodiment.

FIG. 22 is a block diagram illustrating the configuration of a detecting system of a fifth embodiment. FIG. 23 is a block diagram illustrating a detailed configuration of the MCU 17 of the fifth embodiment.

As illustrated in FIG. 22, the detecting system 100 of the fifth embodiment has a microphone 61. The microphone 61, for example, receives input of sound in a room space in which the person 500 to be observed acts and outputs a sound signal to the MCU 17.

As illustrated in FIG. 23, the MCU 17 receives input of the sound signal from the microphone 61 via an I/O 18G. The control unit 22 receives input of the sound signal from the microphone 61 and calculates a change rate Vacou of the level of the sound signal. The control unit 22 calculates the determination value D to be compared with the threshold in accordance with, for example, the following equation (2) in the process of step S615 illustrated in FIG. 6.

$$D = \alpha Vacc + \beta Vrot - \gamma Vvar + \delta Vacou \qquad \text{Equation (2)}$$

δ denotes a parameter for determining weight. As described above, in the fifth embodiment, the larger the change of the level of the sound signal is, the more the possibility of detecting that the motion of the person 500 to be observed is in an abnormal state is increased.

In the detecting system of the fifth embodiment, in the case where a large sound is generated by a drop, the drop of the person 500 to be observed is detected more easily. Also in a situation of a dark place or the like in which the detection rate of a drop of the person 500 to be observed based on an image captured by the camera 11 decreases, by using sound as an input, a drop of the person 500 to be observed can be detected.

Sixth Embodiment

A detecting system of a sixth embodiment will be described. The detecting system 100 has a far-infrared sensor. An output of the sensor is received, and a part of high temperature is set as a condition of detecting a drop or fall of the person 500 to be observed.

Figure 24:
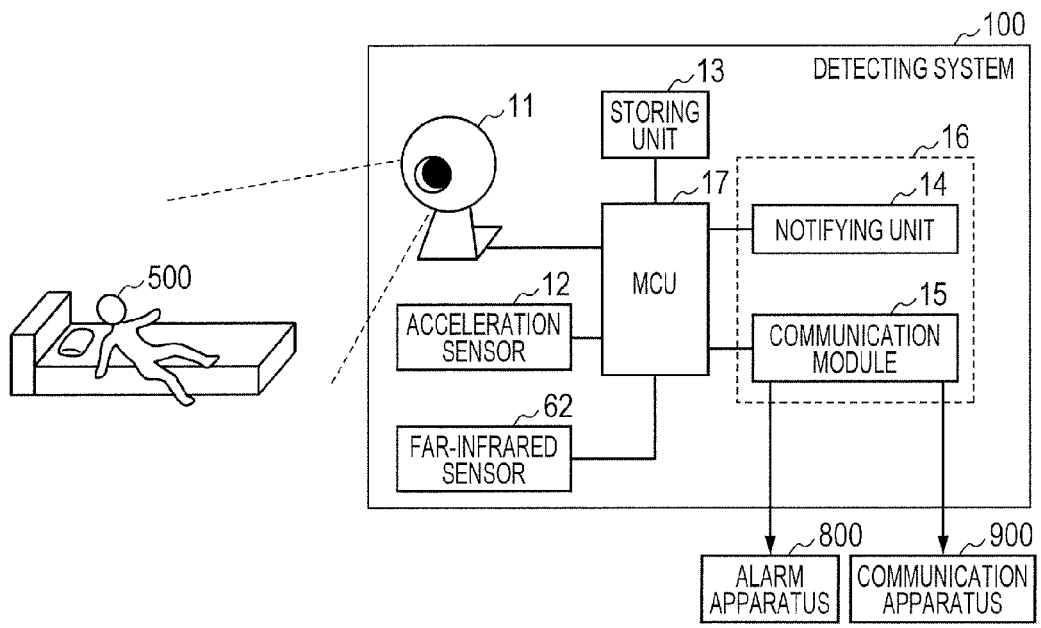
FIG. 24 is a block diagram illustrating the configuration of a detecting system of a sixth embodiment.
Figure 25:
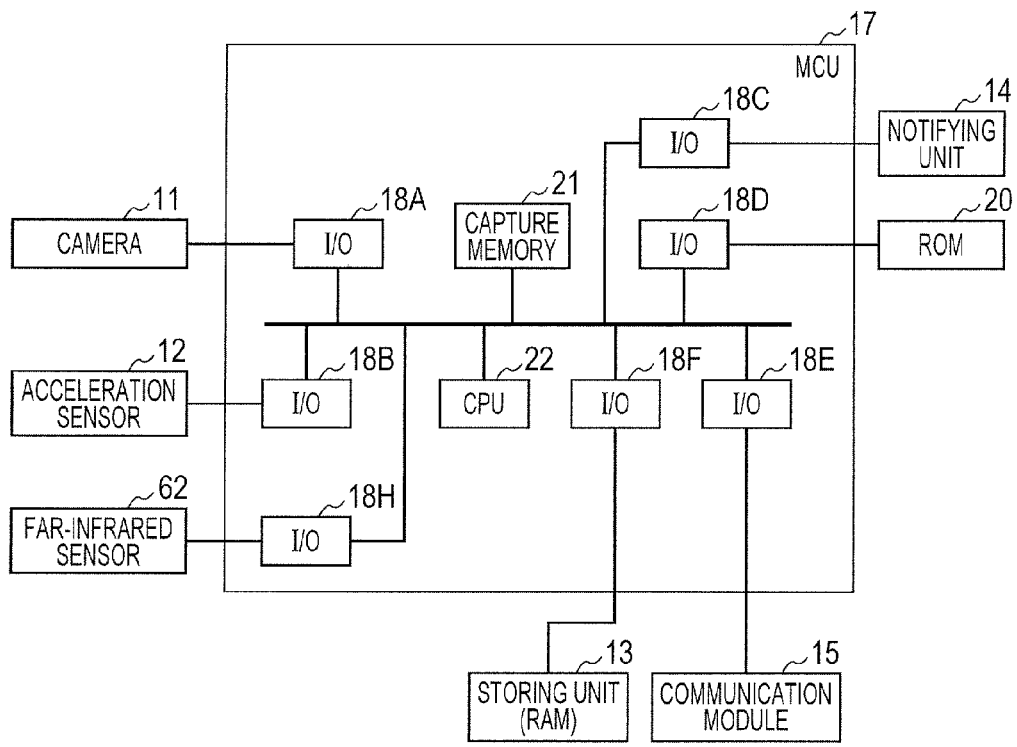
FIG. 25 is a block diagram illustrating a detailed configuration of the MCU 17 of the sixth embodiment.

FIG. 24 is a block diagram illustrating the configuration of a detecting system of a sixth embodiment. FIG. 25 is a block diagram illustrating a detailed configuration of the MCU 17 of the sixth embodiment.

As illustrated in FIG. 24, the detecting system 100 of the sixth embodiment has a far-infrared sensor 62. The far-infrared sensor 62, for example, detects the temperature of the room space in which the person 500 to be observed acts and outputs the detection result to the MCU 17.

As illustrated in FIG. 25, the MCU 17 receives a signal from the far-infrared sensor 62 via an I/O 18H. For example, in a process of calculating the average vector of motion vectors of a group shown in FIG. 10, the motion vector of each block may be multiplied with a temperature value to calculate the average vector acc. By the operation, a motion of a non-living material can be excluded from objects of detection of a drop or fall of the person 500 to be observed. Also in a situation of a dark place or the like in which the detection rate of a drop of the person 500 to be observed based on an image captured by the camera 11 decreases, by using an output of the sensor, a drop of the person 500 to be observed can be detected.

MODIFICATIONS

Although the examples that the detecting system 100 has the acceleration sensor and the far-infrared sensor have been described, the present invention is not limited to the examples. The detecting system 100 may be provided with one or any combination of various sensors such as a color sensor, a distance sensor, a millimeter-wave sensor, an ultrasound sensor, and a near-infrared sensor. The detecting system 100 detects a drop or fall of the person to be observed in accordance with an output result of those sensors.

As the embodiments have been described as described above, obviously any of the embodiments may be combined.

Although the invention achieved by the inventors herein has been described concretely on the basis of the embodiments, the present invention is not limited to the foregoing embodiments but can be variously modified without departing from the gist of the present invention.

It is to be considered that the embodiments disclosed here are illustrative and not restrictive in all respects. The scope of the present invention is defined by the scope of claims rather than the above description, and all of changes that fall within the meaning and range of equivalency of the claims are therefore intended to be embraced therein.

What is claimed is:

1. A detecting apparatus for detecting a motion state of a person to be observed from an image captured, comprising:
   an input/output unit;
   a memory for storing video data which is received by the input/output unit; and
   a control unit controlling a process of detecting a motion state of the person to be observed on the basis of the video data stored in the memory,
   wherein the control unit comprises:
   a calculating unit calculating a motion vector of each of a plurality of blocks of an image including the video data;
   a detecting unit extracting a block group as a set of the blocks in each of which the size of the motion vector exceeds a predetermined value on the basis of the calculated motion vectors and detecting an abnormal motion state of the person to be observed on the basis of the motion vectors of the blocks included in the extracted block group, and
   an informing control unit outputting a signal indicative of an abnormal state of the person to be observed in the case where the abnormal motion state of the person to be observed is detected by the detecting unit.

2. The detecting apparatus according to claim 1, wherein the detecting unit comprises:
   a grouping unit extracting and grouping adjacent blocks in each of which the size of the calculated motion vector exceeds a first threshold;
   a characteristic amount calculating unit calculating a characteristic amount of a motion vector of each group on the basis of the motion vectors of the blocks including each of the groups formed, and
   a determining unit detecting an abnormal motion state of the person to be observed on the basis of the calculated characteristic amount of the motion vector of each of the groups.

3. The detecting apparatus according to claim 2, wherein the grouping unit sets priority on the basis of the number of blocks included in one or more groups formed, and
   the characteristic amount calculating unit calculates the characteristic amounts of the motion vectors in the groups in accordance with the priority set for the groups.

4. The detecting apparatus according to claim 2,
   wherein the characteristic amount of the motion vector in each of the groups calculated by the characteristic amount calculating unit includes at least any of an average value of gravity force direction components of the motion vectors of the blocks included in each of the groups, a variance value of the motion vectors of the blocks, and the values of the rotation direction components made by the motion vectors of the blocks including the group in the case where the gravity center position of each group is set as a center, and the determining unit detects the state of the person to be observed on the basis of the characteristic amount calculated by the characteristic amount calculating unit.

5. The detecting apparatus according to claim 4, wherein the determining unit compares an average value of the motion vectors of the blocks calculated by the characteristic amount calculating unit with a second threshold and, in the case where the average value exceeds the second threshold, detects that the state of the person to be observed is an abnormal motion state.

6. The detecting apparatus according to claim 4, wherein the determining unit compares a variance value of the motion vectors of the blocks calculated by the characteristic amount calculating unit with a second threshold and, in the case where the variance value does not exceed the second threshold, detects that the state of the person to be observed is an abnormal motion state.

7. The detecting apparatus according to claim 4, wherein the determining unit compares a value of the rotation direction component calculated by the characteristic amount calculating unit with a second threshold and, in the case where the value of the rotation direction component exceeds the second threshold, detects that the state of the person to be observed is an abnormal motion state.

8. The detecting apparatus according to claim 4, wherein the determining unit determines motion states of a plurality of groups and, on the basis of a combination of the determination results of the groups, determines the degree of an abnormal motion state of the person to be observed.

9. The detecting apparatus according to claim 1, wherein the control unit includes a thinning processing unit performing a thinning process of reducing pixels in the horizontal direction, of the video data stored in the memory, and the calculating unit calculates a motion vector of the video data obtained by reducing the pixels in the horizontal direction by the thinning processing unit.

10. The detecting apparatus according to claim 9, wherein the control unit receives information of acceleration of a camera which generates the video data by the input/output unit and stores it into the memory, and the thinning processing unit corrects at least any of a deviation of a pitch angle of the camera and a deviation of a roll angle of the camera on the basis of the information of the acceleration for video data stored in the memory, and performs the thinning process on the corrected video data.

11. The detecting apparatus according to claim 1, wherein informing of an abnormal state of the person to be observed by the informing control unit of the detecting apparatus includes transmission of information indicating that the person to be observed is in an abnormal state to an external communication apparatus.

12. A detecting system for detecting a motion state of a person to be observed from a video image captured, comprising:
a camera generating video data by imaging;
a memory for storing the video data generated by the camera;
a control unit controlling a process of detecting a motion state of the person to be observed on the basis of the video data stored in the memory; and
an informing unit informing of an abnormal state of the person to be observed in the case where the control unit detects an abnormal state of the person to be observed,
wherein the control unit comprises:
a calculating unit calculating a motion vector of each of a plurality of blocks of an image including the video data;
a detecting unit extracting a block group as a set of the blocks in each of which the size of the motion vector exceeds a predetermined value on the basis of the calculated motion vectors and detecting an abnormal motion state of the person to be observed on the basis of the motion vectors of the blocks included in the extracted block group, and
an informing control unit making the informing unit perform the informing in the case where the abnormal motion state of the person to be observed is detected by the detecting unit.

13. A detecting method of a detecting system for detecting a motion state of a person to be observed from a video image captured, the detecting system comprising: a camera generating video data by imaging; a memory for storing the video data generated by the camera; a processor controlling a process of detecting a motion state of the person to be observed on the basis of the video data stored in the memory; and an informing unit,
the detecting method comprising the steps of:
calculating a motion vector of each of a plurality of blocks of an image including the video data by the processor;
extracting a block group as a set of the blocks in each of which the size of the motion vector exceeds a predetermined value on the basis of the calculated motion vectors and detecting an abnormal motion state of the person to be observed on the basis of the motion vectors of the blocks included in the extracted block group by the processor, and
making the informing unit perform the informing by the processor in the case where the abnormal motion state of the person to be observed is detected by the detecting step.

* * * * *